US008480819B2

(12) United States Patent
Futamura

(10) Patent No.: US 8,480,819 B2
(45) Date of Patent: Jul. 9, 2013

(54) HIGH-STRENGTH COLD-ROLLED STEEL SHEET EXCELLENT IN WORKABILITY AND METHOD FOR MANUFACTURING THE SAME

(75) Inventor: Yuichi Futamura, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/983,482

(22) Filed: Jan. 3, 2011

(65) Prior Publication Data

US 2011/0186189 A1 Aug. 4, 2011

(30) Foreign Application Priority Data

Jan. 29, 2010 (JP) .................................. 2010-019505

(51) Int. Cl.
C22C 38/00 (2006.01)

(52) U.S. Cl.
USPC ............................ 148/320; 148/331; 148/337

(58) Field of Classification Search
USPC ......... 148/320, 331–337, 533, 622, 651–654, 148/660–664; 428/659
See application file for complete search history.

(56) References Cited

U.S. PATENT DOCUMENTS

| | | | |
|---|---|---|---|
| 7,591,977 B2 | 9/2009 | Ikeda et al. | |
| 7,767,036 B2 | 8/2010 | Kashima et al. | |
| 2007/0196685 A1 | 8/2007 | Futamura et al. | |
| 2008/0251161 A1* | 10/2008 | Kashima et al. | 148/334 |
| 2010/0003541 A1 | 1/2010 | Futamura et al. | |
| 2010/0108200 A1 | 5/2010 | Futamura et al. | |
| 2010/0172786 A1 | 7/2010 | Nakaya et al. | |
| 2010/0221138 A1 | 9/2010 | Nakaya et al. | |
| 2010/0247957 A1 | 9/2010 | Hoshika et al. | |
| 2010/0247958 A1 | 9/2010 | Tsunezawa et al. | |

FOREIGN PATENT DOCUMENTS

| | | |
|---|---|---|
| CN | 101351570 A | 1/2009 |
| GB | 2 452 230 A | 3/2009 |
| JP | 2005-240178 | 9/2005 |
| JP | 2006-274417 | 10/2006 |

(Continued)

OTHER PUBLICATIONS

United Kingdom Combined Search and Examination Report issued May 26, 2011, in Patent Application No. 1101451.1.
Office Action issued Jun. 29, 2012, in Chinese Patent Application No. 20111030902, filed Jan. 25, 2011 (w/English-language Translation).

(Continued)

*Primary Examiner* — Steven Bos
*Assistant Examiner* — Brian Walck
(74) *Attorney, Agent, or Firm* — Oblon, Spivak, McClelland, Maier & Neustadt, L.L.P.

(57) ABSTRACT

In a cold-rolled steel sheet in relation with the present invention, metallurgical structure of the steel sheet is made a mixture structure including bainite, residual austenite and tempered martensite, particularly, when the metallurgical structure is observed with a scanning electron microscope, bainite is constituted of composite structure of high temperature range forming bainite with 1 μm or above average distance between neighboring residual austenite and/or carbide and low temperature range forming bainite with below 1 μm average distance between neighboring residual austenite and/or carbide, and when the area ratio of the high temperature range forming bainite with respect to total metallurgical structure is made a and the total area ratio of the low temperature range forming bainite and the tempered martensite with respect to the total metallurgical structure is made b, a: 20-80%, b: 20-80%, and a+b: 70% or above are satisfied. The cold-rolled steel sheet in relation with the present invention is improved in all of the elongation (EL), stretch flange formability (A), and bending properties (R) with a good balance, is excellent in the overall workability, and has 980 MPa or above tensile strength.

18 Claims, 3 Drawing Sheets

FOREIGN PATENT DOCUMENTS

| | | |
|---|---|---|
| JP | 2007-321236 | 12/2007 |
| JP | 2007-321237 | 12/2007 |
| WO | WO 2010/030021 A1 | 3/2010 |
| WO | WO 2010/137343 A1 | 12/2010 |

OTHER PUBLICATIONS

Office Action issued Sep. 4, 2012, in Korean Patent Application No. 2011-0008215, filed Jan. 27, 2011 (w/English-language translation).

* cited by examiner

F I G . 6
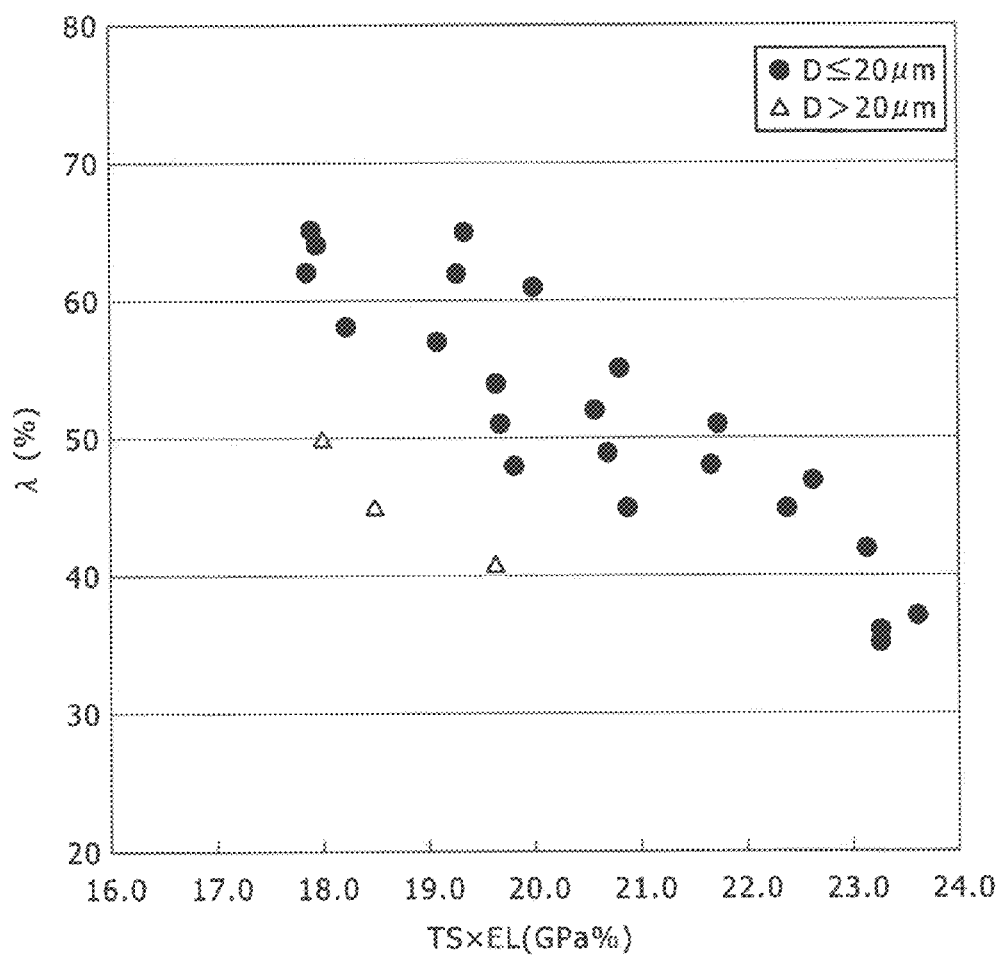

HIGH-STRENGTH COLD-ROLLED STEEL SHEET EXCELLENT IN WORKABILITY AND METHOD FOR MANUFACTURING THE SAME

BACKGROUND OF THE INVENTION

1. Field of the Invention

The present invention relates to a cold-rolled steel sheet and a method for manufacturing it, and relates specifically to a cold-rolled steel sheet with high-strength of 980 MPa or above tensile strength and a method for manufacturing it.

2. Description of the Related Art

The automobile industry is facing an urgent need of responding to global environmental issues such as $CO_2$ discharge regulation. On the other hand, from the viewpoint of securing safety of passengers, the safety standards for collision of automobiles have been made stricter, and structural designing sufficiently securing safety in the occupied space has been progressing. In order to achieve these requirements simultaneously, it is effective to use a high-strength steel sheet (high-ten) with 980 MPa or above tensile strength as a structural member for an automobile and to make the thickness further thinner to reduce the vehicle bodyweight. However, in general, when the strength of a steel sheet is increased, the workability deteriorates, and therefore improvement of the workability is an unavoidable problem in order to apply a high-ten to members for automobiles.

As a steel sheet provided with both the strength and workability, TRIP (Transformation Induced Plasticity) steel sheets are known. As one of the TRIP steel sheets, a TBF steel sheet with a base metal phase of bainitic ferrite including residual austenite (may be hereinafter referred to as "residual γ" is known (Japanese Unexamined Patent Application Publication Nos. 2005-240178, 2006-274417, 2007-321236, and 2007-321237). With respect to the TBF steel sheet, high strength can be obtained by the presence of hard bainitic ferrite, and excellent elongation (EL) and stretch flange formability (λ) can be obtained by the presence of fine residual γ present on the boundary of bainitic ferrite, and therefore both of the strength and excellent workability can be achieved.

However, $CO_2$ discharge regulation has become more severe in recent years, and further reduction of the vehicle body weight has been required. Accordingly, even for a difficult-to-form member for which a low strength steel sheet with the excellent workability was used conventionally, application of a high-ten with 980 MPa or above tensile strength has been studied. More specifically, positive use of the high-ten has been considered not only for frame members of the vehicle body but also for seat members and the like.

As described above, the steel sheet used as a member for automobiles is required to be provided with both the high strength and workability. Particularly recently, further improvement of the overall workability including the local deformation performance such as the stretch flange formability (bore expandability) and bending properties in addition to the elongation has been highly required for a 980 MPa or above high-strength steel sheet whose applied amount has been increasing.

SUMMARY OF THE INVENTION

The present invention was developed considering such circumstances, and its purpose is to provide a high-strength cold-rolled steel sheet with 980 MPa or above tensile strength excellent in the overall workability whose elongation (EL), stretch flange formability (λ) and bending properties (R) are all improved with a good balance, and a technology for manufacturing the high-strength cold-rolled steel sheet.

The high-strength cold-rolled steel sheet in relation with the present invention that could solve the problems contains in mass %: C, 0.10-0.3%, Si: 1.0-3.0%, Mn: 1.5-3%, Al: 0.005-0.2%, satisfies: P: 0.1% or below, S: 0.05% or below, the remainder including iron with inevitable impurities, in which; metallurgical structure of the steel sheet includes bainite, residual austenite and tempered martensite, (1) when the metallurgical structure is observed with a scanning electron microscope;

bainite is constituted of composite structure of high temperature range forming bainite with 1 μm or above average distance between neighboring residual austenite and/or carbide and low temperature range forming bainite with below 1 μm average distance between neighboring residual austenite and/or carbide, and when the area ratio of the high temperature range forming bainite with respect to total metallurgical structure is made a and the total area ratio of the low temperature range forming bainite and the tempered martensite with respect to the total metallurgical structure is made b, a: 20-80%, b: 20-80%, and a+b: 70% or above are satisfied, and (2) volumetric ratio of residual austenite measured by a saturation magnetization method is 3% or above with respect to the total metallurgical structure.

When a MA mixture phase in which quenched martensite and residual austenite are compounded is present in the metallurgical structure, it is preferable that a number ratio of the MA mixture phase satisfying that an equivalent circle diameter d at an observed cross-section exceeds 3 μm with respect to the number of the total MA mixture phase is below 15% (inclusive of 0%).

It is preferable that an average equivalent circle diameter D of former austenite grains is 20 μm or below.

The steel sheet may further contain as other elements:
(a) Cr: 1% or below and/or Mo: 1% or below,
(b) one kind or more selected from a group consisting of Ti: 0.15% or below, Nb: 0.15% or below, and V: 0.15% or below,
(c) Cu: 1% or below and/or Ni: 1% or below,
(d) B: 0.005% or below, and
(e) one kind or more selected from a group consisting of: Ca: 0.01% or below, Mg: 0.01% or below, and rare earth metal: 0.01% or below.

The steel sheet may include a hot-dip galvanizing layer or a hot-dip galvannealing layer on a surface.

The high-strength cold-rolled steel sheet can be manufactured by the steps in this sequence:

heating the steel sheet to a temperature of $A_{C3}$ point or above and soaking thereafter for 50 s or more;

cooling it at an average cooling rate of 15° C./s or above to an optional temperature T satisfying the inequality (1) below;

holding it for 5-100 s at a temperature range satisfying the inequality (1) below; and holding it for 200 s or more at a temperature range satisfying the inequality (2) below.

$$400°\ C. \leq T1(°\ C.) \leq 540°\ C. \qquad (1)$$

$$200°\ C. \leq T2(°\ C.) < 400°\ C. \qquad (2)$$

According to the present invention, the metallurgical structure of the cold-rolled steel sheet is made a structure including bainite, residual γ and tempered martensite, and particularly with respect to the bainite, both of two kinds of bainite with different existing form of the residual γ and carbide, they are the bainite formed in the high temperature range of 400° C. or above and 540° C. or below (may be hereinafter referred to as "high temperature range forming bainite") and the bainite formed in a low temperature range of 200° C. or above and below 400° C. (may be hereinafter referred to as "low temperature range forming bainite") are formed, and therefore a high-strength cold-rolled steel sheet with the excellent workability which is excellent in all of the elongation (EL), stretch flange formability (λ) and bending properties (R) even in a high strength range of 980 MPa or above can be obtained. Also, according to the present invention, a method for manufacturing a cold-rolled steel sheet attaining both of such high strength and excellent workability can be provided.

BRIEF DESCRIPTION OF THE DRAWING

FIG. 6 is a graph showing the relation between tensile strength (TS)×elongation (EL) and bore expandability ratio (λ).

DETAILED DESCRIPTION OF THE PREFERRED EMBODIMENTS

Figure 1:
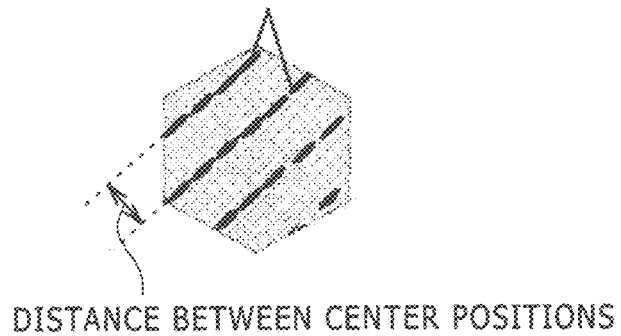
FIG. 1 is a schematic drawing showing an example of an average distance between neighboring residual austenite and/or carbide.

With respect to the high-strength cold-rolled steel sheet with 980 MPa or above tensile strength, the present inventors have made studies in order to improve the overall workability by improving all of the elongation, stretch flange formability and bending properties. As a result, followings were found out and the present invention was completed.

(1) When the metallurgical structure of the cold-rolled steel sheet is made a mixture structure including bainite, residual austenite and tempered martensite, particularly when, with respect to bainite, two kinds of the bainite of the high temperature range forming bainite with 1 μm or above average distance of the distance between the centers of neighboring residual γ to each other, neighboring carbide to each other, or neighboring residual γ and carbide (may be hereinafter referred to as "residual γ and the like") and the low temperature range forming bainite with below 1 μm of the average of the distance between centers of residual γ and the like are formed, a high-strength cold-rolled steel sheet excellent in the overall workability in which all of the elongation, stretch flange formability and bending properties are improved can be provided, (2) more specifically, out of the metallurgical structure, the high temperature range forming bainite contributes to improvement of the elongation (EL) among the workability of the cold-rolled steel sheet, and the low temperature range forming bainite acts for improvement of the stretch flange formability (λ) and bending properties (R) among the workability of the cold-rolled steel sheet, (3) in order to manufacture the high-strength cold-rolled steel sheet including such two kinds of bainite, the steel sheet may be heated at a predetermined temperature, be rapidly cooled thereafter at an average cooling rate of 15° C./s or above to an optional temperature T in the temperature range of 400° C. or above and 540° C. or below (may be hereinafter referred to as "T1 temperature range"), be held at the T1 temperature range for 5-100 s to form the high temperature range forming bainite, be cooled thereafter to the temperature range of 200° C. or above and be low 400° C. (may be hereinafter referred to as "T2 temperature range"), and be held at the T2 temperature range for 200 s or more.

First, the metallurgical structure characterizing the cold-rolled steel sheet in relation with the present invention will be described.

<On Metallurgical Structure>

The metallurgical structure of the cold-rolled steel sheet in relation with the present invention is constituted of a mixture structure of the bainite, residual austenite and tempered martensite.

First, the bainite characterizing the present invention most conspicuously will be described.

In the present invention, bainite is the main phase (base metal phase) occupying 70 area % or more with respect to the total metallurgical structure. The bainite includes bainitic ferrite also. The bainite is a structure in which carbide is precipitated, whereas the bainitic ferrite is a structure in which the carbide is not precipitated. Also, in the present invention, the area ratio of the bainite includes the area ratio of the tempered martensite as described below.

Further, the present invention is characterized in that the bainite is constituted of a composite structure of the high temperature range forming bainite and the low temperature range forming bainite with higher strength compared with the high temperature range forming bainite. In the present invention, the bainite is constituted of two kinds of the bainitic structure, thereby the elongation can be improved further while securing the excellent stretch flange formability and bending properties, and the overall workability can be improved. This is considered to be due to the fact that the work hardening performance is enhanced because non-uniform deformation occurs by compounding the bainitic structure with different strength levels.

In the present invention, the high temperature range forming bainite is of the bainitic structure formed in the T1 temperature range of 400° C. or above and 540° C. or below in a cooling step after heating to a temperature of $A_{C3}$ point or above, and means the bainite with 1 μm or above average distance of the residual γ and the like when the cross-section of the steel sheet subjected to nital etching is observed by a scanning electron microscope.

On the other hand, in the present invention, the low temperature range forming bainite is of the bainitic structure formed in the T2 temperature range of 200° C. or above and below 400° C. in a cooling step after heating to a temperature of $A_{C3}$ point or above, and means the bainite with an average distance of below 1 μm of the residual γ and the like when the cross-section of the steel sheet subjected to nital etching is observed by a scanning electron microscope. Also, because the low temperature range forming bainite and the tempered martensite cannot be distinguished even by observation by a microscope, the low temperature range forming bainite and the tempered martensite may be collectively referred to as "low temperature range forming bainite and the like" in the present invention.

Here, "average distance of residual γ and the like" is an average value of the measured results of the distance between the center positions of the neighboring residual γ to each other, the distance between the center positions of the neighboring carbide to each other, or the distance between the center positions of the neighboring residual γ and the carbide when the cross-section of the steel sheet is observed by a microscope. The distance between the center positions means the distance between the center positions to each other when the center position is obtained with respect to the residual γ or the carbide. The major diameter and the minor diameter are determined on the residual γ or the carbide, and the center position is made the position where the major diameter and the minor diameter cross with each other. However, when the residual γ or the carbide precipitates on the boundary of laths, the plurality of residual γ and carbide are joined to each other and the shape become needle-like or sheet-like, therefore the distance between the lines formed by joining of the residual austenite and/or the carbide in the direction of the major diameter (distance between the laths) as shown in FIG. 1 may be made the distance between the center positions instead of the distance of the residual austenite and/or the carbide to each other.

According to the present invention, a high-strength cold-rolled steel sheet in which the overall workability is improved can be obtained by making the bainite of a composite bainitic structure including the high temperature range forming bainite and low temperature range forming bainite and the like. That is, because the high temperature range forming bainite is softer than the low temperature range forming bainite, it acts in increasing the elongation (EL) of the steel sheet and contributes to improvement of the workability. On the other hand, because the carbide and the residual γ are small and stress concentration is reduced in deformation, the low temperature range forming bainite and the like have an action of improving the stretch flange formability (λ) and bending properties (R) of the steel sheet, and contributes to improvement of the workability. Also, in the present invention, such high temperature range forming bainite and low temperature range forming bainite and the like are compounded, and therefore the work hardening performance is enhanced, the elongation is further improved and the workability is improved.

The reason the bainite is classified into "high temperature range forming bainite" and "low temperature range forming bainite and the like" by difference in the formation temperature range and difference in the average distance of the residual γ and the like as described above in the present invention is that bainite is hard to be classified clearly according to general academic structure classification. For example, although lath-like bainite and the bainitic ferrite are classified into upper bainite and lower bainite according to the transformation temperature, precipitation of the carbide accompanying the bainitic transformation is inhibited in a steel kind including a large amount of Si, and therefore distinguishing them including martensitic structure is difficult by observation by a scanning electron microscope (SEM). Therefore, in the present invention, the bainite was classified as described above instead of classification by academic definition of structure.

The distribution condition of the high temperature range forming bainite and the low temperature range forming bainite and the like is not particularly limited, and both of the high temperature range forming bainite and the low temperature range forming bainite and the like may be mixingly formed inside the former γ grains, or the high temperature range forming bainite and the low temperature range forming bainite and the like may be formed respectively inside the respective former γ grains.

Figures 2A, 2B:
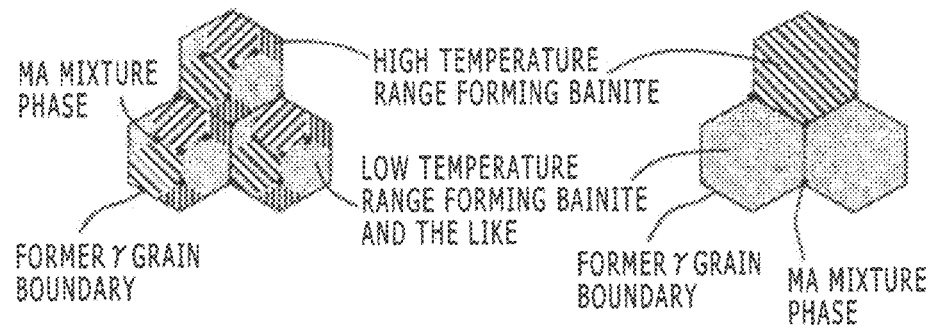
FIGS. 2A and 2B are drawings schematically showing a distribution state of the high temperature range forming bainite and the low temperature range forming bainite and the like (low temperature range forming bainite+tempered martensite).

A drawing schematically showing the distribution condition of the high temperature range forming bainite and the low temperature range forming bainite and the like is shown in FIGS. 2A and 2B. FIG. 2A shows a state in which both of the high temperature range forming bainite and the low temperature range forming bainite and the like are mixingly formed inside the former γ grains, whereas FIG. 2B shows a state in which the high temperature range forming bainite and the low temperature range forming bainite and the like are respectively formed inside the respective former γ grains. The black dots shown in FIGS. 2A and 2B show the MA mixture phases. The MA mixture phase will be described later.

In the present invention, when the area ratio of the high temperature range forming bainite against the total metallurgical structure is made a and the total area ratio of the low temperature range forming bainite and the tempered martensite against the total metallurgical structure is made b, it is necessary that both of a and b satisfy 20-80%.

When the area ratio a of the high temperature range forming bainite or the total area ratio b of the low temperature range forming bainite and the like is below 20% or exceeds 80%, a balance between the formation amount of the high temperature range forming bainite and the low temperature range forming bainite and the like deteriorates, and the effect of compounding the high temperature range forming bainite and the low temperature range forming bainite and the like cannot be exerted. Therefore, any performance of the elongation, stretch flange formability, or bending properties deteriorates, and the overall workability cannot be improved. Accordingly, the area ratio a is to be made 20-80%, preferably 25-75%, and more preferably 30-70%. Also, the total area ratio b is to be made 20-80%, preferably 25-75%, and more preferably 30-70%.

The relation between a and b described above is not particularly limited as far as each the range satisfies the ranges described above, and all states of a>b, a<b and a=b can be included.

The reason the total area ratio of the low temperature range forming bainite and the tempered martensite was stipulated here instead of the area ratio of the low temperature range forming bainite is that the influence exerted on properties by respective structures formed by holding the steel sheet at the T2 temperature range for a predetermined time or more becomes approximately equal.

The mixing ratio between the high temperature range forming bainite and the low temperature range forming bainite and the like can be decided according to the properties required for the cold-rolled steel sheet. More specifically, in order to improve the stretch flange formability (λ) among the workabilities the cold-rolled steel sheet, the ratio of the high temperature range forming bainite can be reduced, and the ratio of the low temperature range forming bainite and the like can be increased. On the other hand, in order to improve the elongation (EL) among the workabilities of the cold-rolled steel sheet, the ratio of the high temperature range forming bainite can be increased, and the ratio of the low temperature range forming bainite and the like can be reduced. Also, in order to enhance the strength of the cold-rolled steel sheet, the ratio of the low temperature range forming bainite and the like can be increased, and the ratio of the high temperature range forming bainite can be reduced.

Further, in the present invention, it is necessary that the total of the area ratio a and the total area ratio b (a+b) with respect to the overall metallurgical structure satisfies 70% or above. When (a+b) is below 70%, the tensile strength of 980 MPa or above cannot be secured. Therefore, (a+b) is to be 70% or above, preferably 75% or above, and more preferably 80% or above. Although the upper limit of (a+b) is not particularly limited, it is 95% for example.

The cold-rolled steel sheet according to the present invention includes the residual γ in addition to the high temperature range forming bainite, the low temperature range forming bainite and the tempered martensite.

The residual γ is a structure exerting the excellent elongation by being transformed to martensite when a steel plate is deformed to cause strain and exerting the effect of promoting hardening of the deformation point and preventing concentration of strain. Such effect is called a TRIP effect in general. In order to exert such effect, the residual γ is to be contained 3 vol. % or above, preferably 5 vol. % or above, and more preferably 7 vol. % or above, when the fraction of the residual γ with respect to the total metallurgical structure is measured by a saturation magnetization method. However, when the fraction of the residual γ becomes excessively high, the MA mixture phase which will be described later is formed and the MA mixture phase becomes easily coarsened, and therefore the stretch flange formability and bending properties are lowered. Accordingly, the upper limit of the residual γ is to be approximately 20 vol Although the residual γ is formed mainly between the laths of the metallurgical structure, it occasionally is present in a lumpy shape as a part of the MA mixture phase which will be described later on the grain boundary of the aggregates of lath-like structure (block and packet, for example) and the former γ.

As described above, the metallurgical structure of the cold-rolled steel sheet in relation with the present invention includes the bainite, residual γ and tempered martensite, and the remainder of the metallurgical structure is not particularly limited. For example, the MA mixture phase in which the tempered martensite and the residual γ are compounded, soft polygonal ferrite, or pearlite and the like can also be present. It is preferable that such remainder structure is to be inhibited to 20 area % or below in terms of the ratio with respect to the total metallurgical structure when observed by a SEM.

Here, the MA mixture phase will be described. The MA mixture phase is commonly known as a composite phase of the quenched martensite and the residual γ, and is a structure formed by transformation of a part of the structure that has been present as untransformed austenite before final cooling to martensite in final cooling with the remainder remaining as austenite. Because carbon is concentrated to high content during a heat treatment process (austempering treatment, in particular) and a part becomes martensitic structure, the MA mixture phase formed as described above is of a very hard structure. Accordingly, difference in hardness between the base metal phase formed of bainite and the MA mixture phase is large and stress is concentrated in deformation which is liable to become a starting point of generation of a void, and therefore, when the MA mixture phase is formed excessively, the local deformation performance lowers and the stretch flange formability and bending properties lower.

Because the cold-rolled steel sheet in relation with the present invention contains comparatively high content of Si as will be described later, the MA mixture phase becomes easily formed. When the MA mixture phase is present, it is preferable that its area ratio is 30% or below with respect to the total metallurgical structure when observed by an optical microscope.

Also, it is preferable that the number ratio of the MA mixture phase whose equivalent circle diameter d at the cross-section of observation exceeds 3 μm among the MA mixture phase described above is below 15% (inclusive of 0%) with respect to the number of the total MA mixture phase. Because the tendency that the void is more easily generated when the grain size of the MA mixture phase becomes larger was recognized by an experiment, the MA mixture phase is preferable to be as small as possible. The number ratio of the MA mixture phase whose equivalent circle diameter d at the cross-section of observation exceeds 3 μm is to be preferably below 10%, and is more preferably below 5%. Also, the number ratio of the MA mixture phase whose equivalent circle diameter d exceeds 3 μm can be calculated by observing the surface of the cross-section parallel to the rolling direction by an optical microscope.

When soft polygonal ferrite and pearlite are present, the total of the area ratio of these structures is preferable to be 200 or below with respect to the total metallurgical structure.

The metallurgical structure described above can be measured by the procedure described below.

The high temperature range forming bainite, low temperature range forming bainite and the like, MA mixture phase, polygonal ferrite and pearlite can be discriminated by observing the ¼ position of the sheet thickness out of the cross-sections parallel with the rolling direction of the steel sheet by a SEM with approximately 3,000 times magnification. According to observation by the SEM, the high temperature range forming bainite and the low temperature range forming bainite and the like are observed mainly in the gray color, and are observed as the structure in which the residual γ and the like of the white color or gray color are dispersed inside the crystal grains. The polygonal ferrite is observed as a crystal grain not including the residual γ and the like of the white color or gray color described above inside the crystal grains. The pearlite is observed as the structure in which the carbide and ferrite become a layer form. On the other hand, the MA mixture phase is observed as the structure of the white color by observation of a sample subjected to repeller etching by an optical microscope.

Here, the high temperature range forming bainite and the low temperature range forming bainite and the like can be discriminated by subjecting the cross-section parallel with the rolling direction of the steel sheet to nital etching and observing the ¼ position of the sheet thickness by a SEM with approximately 3,000 times magnification. When the cross-section of the steel sheet is subjected to nital etching, both of the carbide and residual γ are observed as the structure of the white color or the gray color, and it is difficult to distinguish them with each other. Out of them, the carbide (cementite, for example) has the tendency of precipitating inside the lath rather than between the laths as it is formed in a lower temperature range, therefore when the distance between the carbides to each other is wide, it is supposed to have been formed in a high temperature range, whereas when the distance between the carbides to each other is narrow, it is supposed to have been formed in a low temperature range. Also, although the residual γ is formed normally between the laths, the size of the lath becomes smaller as the formation temperature of a structure becomes lower, therefore when the distance between the residual γ to each other is wide, it is supposed to have been formed in a high temperature range, whereas when the distance between the residual γ to each other is narrow, it is supposed to have been formed in a low temperature range. Accordingly, in the present invention, the cross-section which has been subjected to nital etching is observed by a SEM, the structure observed within the observation visual field in the white color or the gray color is watched, and when the distance between the center positions of the neighboring structures is measured, the structure with 1 μm or above of the average value (average distance) is deemed to be the high temperature range forming bainite, whereas the structure with below 1 μm of the average distance is deemed to be the low temperature range forming bainite and the like. Also, the distance between the center positions of the structures can be measured with respect to the structures adjacent to each other at most.

According to the observation by a SEM, the residual γ and carbide are also included in the high temperature range forming bainite and the low temperature range forming bainite and the like, and therefore the area ratio is calculated including the residual austenite.

On the other hand, with respect to the residual γ, because identification of the structure by observation by a SEM is not possible, the volumetric ratio is measured by a saturation magnetization method. The value of the volumetric ratio can read as the area ratio as it is. The detailed measurement theory by the saturation magnetization method can be referred to "R&D KOBE SEIKO GIHO (R&D Technical Bulletin of Kobe Steel). 2002, Vol. 52, No. 3, p. 43-46".

As described above, the volumetric ratio (area ratio) of the residual γ is measured by the saturation magnetization method, whereas the area ratio of the high temperature range forming bainite and the low temperature range forming bainite and the like is measured by observation by a SEM including the residual γ, and therefore the total of them may possibly exceeds 100%.

The MA mixture phase can be observed as a structure in the white color when the cross-section parallel to the rolling direction of the steel sheet is subjected to repeller etching and the ¼ position of the sheet thickness is observed by an optical microscope with approximately 1,000 times magnification, and can be discriminated from other structures. The area ratio of the MA mixture phase can be measured by image analysis of the photograph.

In the cold-rolled steel sheet according to the present invention, the average equivalent circle diameter D of the former γ grains is preferable to be 20 μm or below (not inclusive of 0 μm). By reducing the average equivalent circle diameter D of the former γ grains, all of the elongation, stretch flange formability and bending properties can be further improved. That is, because the metallurgical structure of the cold-rolled steel sheet according to the present invention is constituted of the mixture structure of the bainite, residual austenite and tempered martensite, when the grain size of the austenite before transformation is large, the size of the compounding unit of the bainitic structure becomes large and the sizes of the structures are diversified, and thereby non-uniform deformation occurs, the strain is concentrated locally, and improvement of the workability becomes difficult. Accordingly, it is effective to control the average equivalent circle diameter D of the former γ grain to 20 μm or below, and to reduce macroscopic non-uniformity in several tens μm order. The average equivalent circle diameter D is more preferable to be 15 μm or below, and further more preferable to be 10 μm or below.

The average equivalent circle diameter D of the former γ grains can be measured by SEM-EBSP method in which a SEM and electron backscattering diffraction (EBSP) are combined. More specifically, the former γ grain boundary can be identified by measuring the crystal orientation with 0.1 μm steps for the scope of approximately 100 μm×100 μm of the observation visual field by SEM-EBSP method and thereafter analyzing the relation of the crystal orientation of neighboring measuring points. Based on the former γ grain boundary identified, the average equivalent circle diameter D of the former γ grains can be calculated by a comparison method. With respect to the detailed measurement theory by SEM-EBSP method, "Acta MATERIALIA. 2006, vol. 54, p. 1, 279-1,288" can be referred.

<On Componential Composition>

Next, the componential composition of the cold-rolled steel sheet in relation with the present invention will be described.

The cold-rolled steel sheet in relation with the present invention contains C, 0.10-0.3%, Si: 1.0-3.0%, Mn: 1.5-3%, Al: 0.005-0.2% and satisfies P: 0.1% or below (not inclusive of 0%), S: 0.05% or below (not inclusive of 0%). The reasons such scope was stipulated are as described below.

C is an element required for enhancing the strength of the steel sheet and forming the residual γ. Therefore, C content is to be 0.10% or above, preferably 0.11% or above, and more preferably 0.13% or above. However, when it is excessively contained, the weldability deteriorates. Accordingly, C content is to be 0.3% or below, preferably 0.25% or below, and more preferably 0.20% or below.

Si is a very important element in suppressing precipitation of the carbide while the steel sheet is held in the T1 temperature range and T2 temperature range which will be described later (during the austemper treatment) and effectively forming the residual γ, in addition to contributing to increasing the strength of the steel sheet as a solid solution strengthening element. Therefore, Si content is to be 1.0% or above, preferably 1.2% or above, and more preferably 1.4% or above. However, when it is excessively contained, the γ single phase cannot be secured in heating and soaking for annealing and the ferrite remains, and therefore formation of the high temperature range forming bainite and the low temperature range forming bainite is inhibited. Also, the strength becomes excessively high, the rolling load increases, Si scale is generated on the surface of the steel sheet during hot rolling, and the surface properties of the steel sheet are deteriorated. Accordingly, Si content is to be 3.0% or below, preferably 2.5% or below, and more preferably 2.0% or below.

Mn is an element required for enhancing the quenchability to suppress formation of the ferrite during cooling, and obtaining the bainite and tempered martensite. Also, Mn is an element effectively acting also for stabilizing γ and forming the residual γ. In order that such actions are exerted, Mn content is to be 1.5% or above, preferably 1.8% or above, and more preferably 2.0% or above. However, when it is excessively contained, formation of the high temperature range forming bainite is extremely suppressed. Also, excessive addition causes deterioration of the weldability and deterioration of the workability due to segregation. Accordingly, Mn content is to be 3% or below, preferably 2.8% or below, and more preferably 2.6% or below.

Similar to Si, Al is an element contributing to suppressing precipitation of the carbide while the steel sheet is held in the T1 temperature range and T2 temperature range which will be described later (during the austemper treatment) and forming the residual γ. Also, Al is an element acting as a deoxidizing agent. Therefore, Al content is to be 0.005% or above, preferably 0.01% or above, and more preferably 0.03% or above. However, when Al is excessively contained, the weldability of the steel sheet is extremely deteriorated, and therefore addition of Al should be limited to the minimum for the purpose of deoxidization. Accordingly, Al content is to be 0.2% or below, preferably 0.15% or below, and more preferably 0.1% or below.

P is an element deteriorating the weldability of the steel sheet. Therefore, P content is to be 0.10 or below, preferably 0.08% or below, and more preferably 0.05% or below.

Although P content is preferable to be as little as possible, it is difficult to make it 0% industrially.

Similar to P, S is an element deteriorating the weldability of the steel sheet. Also, S forms sulfide-based inclusions in the steel sheet, and when it increases, the workability is deteriorated. Therefore, S content is to be 0.05% or below, preferably 0.01% or below, and more preferably 0.005% or below. Although S content is preferable to be as little as possible, it is difficult to make it 0% industrially.

The cold-rolled steel sheet in relation with the present invention satisfies the componential composition described above, and the remainder component is substantially iron with inevitable impurities. With respect to impurities, for example, N and O, as well as tramp elements (Pb, Bi, Sb, Sn and the like, for example) are included. Among impurities, N content is preferable to be 0.01% or below (not inclusive of 0%), and O content is preferable to be 0.01% or below (not inclusive of 0%).

Although N is an element precipitating nitride in the steel sheet and contributing to strengthening of the steel sheet, when it is contained excessively, the nitride precipitate in a large amount and deterioration of the elongation (EL), stretch flange formability ($\lambda$), and bending properties (R) are caused. Accordingly, N content is preferable to be 0.01% or below, more preferably 0.008% or below, and further more preferably 0.005% or below.

O is an element causing deterioration of the elongation (EL), stretch flange formability ($\lambda$), and bending properties (R) when it is contained excessively. Accordingly, O content is preferable to be 0.01% or below, more preferably 0.005% or below, and further more preferably 0.003% or below.

The steel sheet according to the present invention may further include as other elements:
(a) Cr: 1% or below and/or Mo: 1% or below,
(b) one or more kind of elements selected from the group consisting of Ti: 0.15% or below, Nb: 0.15% or below, and V: 0.15% or below,
(c) Cu: 1% or below and/or Ni: 1% or below,
(d) B: 0.005% or below,
(e) one or more kind of elements selected from the group consisting of Ca: 0.01% or below, Mg: 0.01% or below, and rare earth metal: 0.01% or below,
and the like.

(a) Similar to Mn, Cr and Mo are elements effectively acting for suppressing formation of the ferrite during cooling, and obtaining the bainite and tempered martensite. These elements can be used solely or jointly. In order that such effects are exerted effectively, it is preferable to contain each Cr and Mo solely by 0.1% or above, and more preferably 0.2% or above. However, when each of Cr and Mo content exceeds 1%, formation of the high temperature range forming bainite is extremely suppressed. Also, excessive addition causes cost increase. Accordingly, it is preferable that each of Cr and Mo is 1% or below, more preferably 0.8% or below, and further more preferably 0.5% or below. When Cr and Mo are used jointly, the total amount of 1.5% or below is recommendable.

(b) Ti, Nb and V are elements having actions of forming precipitates such as the carbide, nitride and the like in the steel sheet, strengthening the steel sheet and miniaturizing the former $\gamma$ grains. In order that such effects are exerted effectively, it is preferable to contain each of Ti, Nb and V solely by 0.01% or above, and more preferably 0.02% or above. However, when they are contained excessively, the carbide precipitates on the grain boundary, and the stretch flange formability and bending properties of the steel sheet deteriorate. Accordingly, it is preferable that each of Ti, Nb and V solely is to be 0.15% or below, more preferably 0.12% or below, and further more preferably 0.1% or below. Each of Ti, Nb and V can be contained solely, or two kinds or more optionally selected may be contained.

(c) Cu and Ni are elements stabilizing $\gamma$, and are elements effectively acting for forming the residual $\gamma$. These elements can be used solely or jointly. In order that such effects are exerted, it is preferable to contain each Cu and Ni solely by 0.05% or above, and more preferably 0.1% or above solely. However, when Cu and Ni are excessively contained, the hot workability deteriorates. Accordingly, it is preferable that each of Cu and Ni is 1% or below solely, more preferably 0.8% or below solely, and further more preferably 0.5% or below solely. Also, when Cu is contained exceeding 1%, the hot workability deteriorates, however when Ni is added, deterioration of the hot workability is suppressed, and therefore when Cu and Ni are used jointly, Cu may be added exceeding 1% although it increases the cost.

(d) Similar to Mn, Cr and Mo, B is an element effectively acting for suppressing formation of the ferrite during cooling, and forming the bainite and tempered martensite. In order that such actions are exerted, it is preferable to contain B by 0.0005% or above, and more preferably 0.001% or above. However, when it is contained excessively, boride is formed and the ductility is deteriorated. Also, when it is contained excessively, similarly to Cr and Mo, formation of the high temperature range forming bainite is extremely suppressed. Accordingly, B content is preferable to be 0.005% or below, more preferably 0.004% or below, and further more preferably 0.003% or below.

(e) Ca, Mg and rare earth metal (REM) are elements acting for finely dispersing inclusions in the steel sheet. In order that such effect is exerted, it is preferable to contain each of Ca, Mg and rare earth metal solely by 0.0005% or above, and more preferably 0.001% or above. However, they are contained excessively, the castability and hot workability are deteriorated, and manufacturing becomes difficult. Also, excessive addition of them causes deterioration of the ductility of the steel sheet. Accordingly, it is preferable that each of Ca, Mg and rare earth metal solely is 0.01% or below, more preferably 0.005% or below, and further more preferably 0.003% or below.

The rare earth metal means including lanthanoid elements (15 elements from La to Lu), Sc (scandium) and Y (yttrium). Among them, it is preferable to contain at least one kind of element selected from the group consisting of La, Ce and Y, and more preferable to contain La and/or Ce.

The metallurgical structure and componential composition of the cold-rolled steel sheet in relation with the present invention were described above.

Next, a method for manufacturing the cold-rolled steel sheet will be described.

The cold-rolled steel sheet can be manufactured by that the steel sheet satisfying the componential composition is subjected to the steps in this sequence:

heating step to a temperature of $A_{C3}$ point or above and soaking thereafter for 50 s or more;

cooling step at an average cooling rate of 15° C./s or above to an optional temperature T satisfying the inequality (1) below;

holding step for 5-100 s at a temperature range satisfying the inequality (1) below; and holding step for 200 s or more at a temperature range satisfying the inequality (2) below.

$$400° C. \leq T1(° C.) \leq 540° C. \qquad (1)$$

$$200° C. \leq T2(° C.) < 400° C. \qquad (2)$$

The method for manufacturing the cold-rolled steel sheet according to an aspect of the present invention will be described below in order.

First, a slab is hot rolled according to a normal method, the hot-rolled steel sheet obtained is cold rolled to prepare as a cold-rolled steel sheet before heating the cold-rolled steel sheet to a temperature of $A_{C3}$ point or above. The hot rolling can be performed, at a finish rolling temperature of 800° C. or above for example, and at a winding temperature of 700° C. or below for example. The cold rolling can be performed with a cold rolling ratio within the scope of 10-70% for example.

The cold-rolled steel sheet obtained by cold rolling is heated to a temperature of $A_{C3}$ point or above in a continuous annealing line, and is converted to the cold-rolled steel sheet having γ single phase by holding it for soaking in the temperature range for 50 or more. When the soaking temperature is below the temperature of $A_{C3}$ point or the soaking time in the temperature range of $A_{C3}$ point or above is shorter than 50 s, the ferrite remains in the austenite, and the total amount of the area ratio a of the high temperature range forming bainite and the total area ratio b of the low temperature range forming bainite and the like (a+b) cannot be secured at a predetermined value or above. Therefore, the soaking temperature is preferable to be $A_{C3}$ point+10° C. or above, and more preferably $A_{C3}$ point+20° C. or above. However, even if the soaking temperature is made excessively high, the total amount does not change much which is an economical loss, and therefore the upper limit is to be 1,000° C., for example. On the other hand, the preferable soaking time is 100 s or above. However, when the soaking time is excessively long, the grain size of the austenite becomes large, and the workability is liable to deteriorate. Accordingly, the soaking time is preferable to be 500 s or below. Also, the average heating rate when the cold-rolled steel sheet is heated to the temperature of $A_{C3}$ point or above can be 1° C./s or above.

The $A_{C3}$ point can be calculated from the equation (a) below which is described in "Leslie Tekko Zairyo Kagaku (The Physical Metallurgy of Steels by Leslie)", Maruzen Co., Ltd., May 31, 1985, p. 273. In the equation (a) below, [ ] represents the content (mass %) of each element, and can be calculated with making the content of the element not included in the steel sheet 0 mass %.

$$A_{C3}(° C.)=910-203\times[C]^{1/2}+44.7\times[Si]-30\times[Mn]-11\times[Cr]+31.5\times[Mo]-20\times[Cu]-15.2\times[Ni]+400\times[Ti]+104\times[V]+700\times[P]+400\times[Al] \quad (a)$$

After the steel sheet is heated to a temperature of $A_{C3}$ point or above and is held for 50 s or more for soaking, it is rapidly cooled at the average cooling rate of 15° C./s or above to an optional temperature T satisfying the inequality (1). By performing rapid cooling for the range from the temperature range of $A_{C3}$ point or above to the optional temperature T satisfying the inequality (1), transformation of the austenite into the polygonal ferrite can be suppressed, and both of the high temperature range forming bainite and the low temperature range forming bainite and the like can be formed by respective predetermined amounts. The average cooling rate in the range is preferable to be 20° C./s or above, and more preferably 25° C./s or above. The upper limit of the average cooling rate is not particularly limited, but can be approximately 100° C./s for example After the steel sheet is cooled to the optional temperature T satisfying the inequality (1), it is held for 5-100 s in the T1 temperature range satisfying the inequality (1), and is thereafter held for 200 s or more in the T2 temperature range satisfying the inequality (2). By properly controlling the time for holding the steel sheet in the T1 temperature range and T2 temperature range respectively, the high temperature range forming bainite and the low temperature range forming bainite and the like can be formed by respective predetermined amounts. More specifically, by holding the steel sheet for a predetermined time in the T1 temperature range, the formation amount of the high temperature range forming bainite and the bainitic ferrite can be controlled, whereas by austemper treatment holding the steel sheet for a predetermined time in the T2 temperature range, the untransformed austenite is transformed into the low temperature range forming bainite, bainitic ferrite, or martensite, carbon is concentrated to the austenite to form the residual γ, and the metallurgical structure stipulated in the present invention can be formed.

Also, by combination of holding the steel sheet in the T2 temperature range and holding the steel sheet in the T1 temperature range, the effect of suppressing formation of the MA mixture phase also can be exerted. With respect to the mechanism, following consideration is possible. In general, when Si and Al are added, precipitation of the carbide is suppressed, and therefore, in austemper treatment, a phenomenon of concentration of carbon into the untransformed austenite accompanying bainitic transformation is recognized. Accordingly, by performing austemper treatment, a large amount of the residual γ can be formed.

Here, the phenomenon of carbon concentrated into the untransformed austenite will be described. It is known that, the concentration amount of carbon is limited to the concentration degree shown by $T_0$ curve where free energy of the ferrite and austenite becomes equal, and therefore bainitic transformation also stops. Because the $T_0$ curve shifts to the lower carbon content side as the temperature becomes higher, when austemper treatment is performed at a comparatively high temperature, even if the treatment time is made long, bainitic transformation comes to stop at a certain degree. At this time, because the stability of the untransformed austenite is low, the coarse MA mixture phase is formed.

In this regard, according to the present invention, the steel sheet is held in the T2 temperature range after being held in the T1 temperature range, thereby the allowable amount of C content to the untransformed austenite can be increased, and therefore bainitic transformation progresses more and the MA mixture phase becomes smaller in the low temperature range than in the high temperature range. Also, the size of the lath-like structure becomes smaller in the case holding the steel sheet in the T2 temperature range compared with the case of holding the steel sheet in the T1 temperature range, therefore the MA mixture phase itself is finely divided even if the MA mixture phase is present, and the MA mixture phase can be made smaller. Furthermore, according to the present invention, the steel sheet is held in the T2 temperature range after it is held in the T1 temperature range for a predetermined time, and therefore, at the time point of starting holding the steel sheet in the T2 temperature range, the high temperature range forming bainite has already been formed. Accordingly, in the T2 temperature range, transformation of the low temperature range forming bainite is promoted triggered by formation of the high temperature range forming bainite, and therefore the effect of capable of shortening the time for austemper treatment is exerted.

Also, even in the case the steel sheet is cooled from the temperature range of $A_{C3}$ point or above to an optional temperature satisfying the inequality (2) without being held in the temperature range T1 and is held only in the T2 temperature range satisfying the inequality (2) (that is, the austemper treatment with simply holding the steel sheet in a low temperature), the size of the lath-like structure becomes small, and therefore the MA mixture phase itself can be made small.

In this case however, because the steel sheet is not held in the T1 temperature range, the high temperature range forming bainite is hardly formed, dislocation density of the lath-like structure in the base becomes large, the strength becomes too high, and the elongation lowers.

Also, in the Japanese Unexamined Patent Application Publication No. 2007-321237, a technology is disclosed in which fine polygonal ferrite is positively formed by heating the steel sheet to a temperature of $A_{C3}$ point+10° C. or higher, thereafter rapidly cooling it to the temperature range of the temperature at which fine polygonal ferrite is formed or below (preferably 650° C. or below) and 360° C. or above, and holding it at a constant temperature in the temperature range. However, in the document, a technical idea of forming two kinds of the high temperature range forming bainite and the low temperature range forming bainite is not disclosed, and the concept of respectively holding the steel sheet separately in the T1 temperature range and T2 temperature range is not described.

According to the present invention, the T1 temperature range stipulated in the inequality (1) is specifically made 400° C. or above and 540° C. or below. By holding the steel sheet for a predetermined time in the temperature range, the high temperature range forming bainite and the bainitic ferrite can be formed. That is, when the steel sheet is held at a temperature range exceeding 540° C., the soft polygonal ferrite and quasi pearlite are formed, and desired properties cannot be obtained. Accordingly, the upper limit of the T1 temperature range is to be 540° C., preferably 520° C., and more preferably 500° C. On the other hand, when it is below 400° C., the high temperature range forming bainite is not formed, and therefore the workability cannot be improved. Accordingly, the lower limit of the T1 temperature range is to be 400° C., and preferably 420° C.

The time the steel sheet is held in the T1 temperature range satisfying the inequality (1) is to be 5-100 s. When the holding time exceeds 100 s, the high temperature range forming bainite is formed excessively, and therefore, as will be described later, even if the steel sheet is held in the T2 temperature range for a predetermined time, the formation amount of the low temperature range forming bainite and the like cannot be secured. Therefore, it is not possible to achieve both of the high strength and the excellent workability. Also, when the steel sheet is held in the T1 temperature range for a long time, carbon is excessively concentrated in the austenite, and therefore even if austemper treatment is performed in the T2 temperature range, the coarse MA mixture phase comes to be formed. Accordingly, the holding time is to be 100 s or below, preferably 90 s or below, and more preferably 80 s or below. However, when the holding time in the T1 temperature range is excessively short, the formation amount of the high temperature range forming bainite becomes less, and therefore the workability cannot be improved. Consequently, the holding time in the T1 temperature range is to be 5 s or above, preferably 7 s or above, and more preferably 10 s or above.

In the present invention, the holding time in the T1 temperature range means the time from the time point when the surface temperature of the steel sheet reaches the upper limit of the T1 temperature range until the time point reaching the lower limit, and specifically is the time from the time point reaching 540° C. until the time point reaching 400° C.

Figure 3:
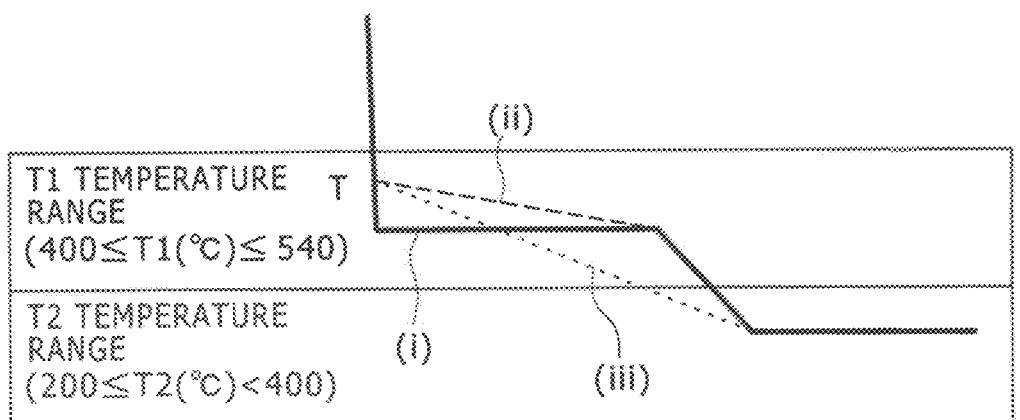
FIG. 3 is a schematic drawing showing an example of a heat pattern in the T1 temperature range and the T2 temperature range.

The method for holding the steel sheet in the T1 temperature range satisfying the inequality (1) is not particularly limited as far as the residence time in the T1 temperature range is 5-100 s, and, for example, the heat pattern shown in (i)-(iii) in FIG. 3 can be adopted. However, the present invention does not imply to limit to this, and the heat patterns other than the above can be arbitrarily adopted as far as the requirements of the present invention are satisfied.

Out of them, (i) in FIG. 3 is an example in which the steel sheet is rapidly cooled from the temperature of $A_{C3}$ point or above to an optional temperature T satisfying the inequality (1) and is thereafter isothermally held for a predetermined time at the temperature T, and is cooled to an optional temperature satisfying the inequality (2) after isothermal holding. In (i) in FIG. 3, the case of performing isothermal holding in one stage is shown, however it is not limited to this, and isothermal holding in 2 stages or more of the different holding temperature may be performed as far as the holding temperature is within the T1 temperature range.

(ii) in FIG. 3 is an example in which the steel plate is rapidly cooled from the temperature of $A_{C3}$ point or above to an optional temperature T satisfying the inequality (1) with the cooling rate being thereafter changed, is cooled within the scope of the T1 temperature range for a predetermined time with the cooling rate being thereafter changed again, and is cooled to an optional temperature satisfying the inequality (2). Although the case in which the steel sheet is cooled within the T1 temperature range for a predetermined time is shown in (ii) in FIG. 3, it is not limited to this, and a step for heating the steel sheet for a predetermined time may be included or cooling and heating may be repeated appropriately as far as they are performed within the T1 temperature range. Also, multi-stage cooling of 2 steps or more with different cooling rate may be performed as shown in (ii) in FIG. 3 instead of single stage cooling. Further, single stage heating and multi-stage heating of 2 stages or more may also be performed (not shown in the drawing).

(iii) in FIG. 3 is an example in which the steel plate is rapidly cooled from the temperature of $A_{C3}$ point or above to an optional temperature T satisfying the inequality (1) with the cooling rate being thereafter changed, and is slowly cooled to an optional temperature satisfying the inequality (2) at a constant cooling rate. Even in the case of thus performing slow cooling, the residence time within the T1 temperature range is to be 5-100 s.

According to an aspect of the present invention, the T2 temperature range stipulated by the inequality (2) is to be specifically 200° C. or above and below 400° C. By holding the steel sheet in the temperature range for a predetermined time, the untransformed austenite not transformed in the T1 temperature range can be transformed to the low temperature range forming bainite, bainitic ferrite or martensite. Also, by securing sufficient holding time, bainitic transformation progresses, the residual γ is eventually formed, and the MA mixture phase is also finely divided. Although the martensite is present as the quenched martensite immediately after the transformation, it is tempered while it is held in the T2 temperature range, and remains as the tempered martensite. The tempered martensite does not exert influence adversely on any of the elongation, stretch flange formability, and bending properties of the steel sheet. However, when the steel is held at 400° C. or above, the coarse MA mixture phase is formed, therefore the local deformation performance deteriorates, and the stretch flange formability and bending properties cannot be improved. Accordingly, the T2 temperature range is to be below 400° C., preferably below 390° C., and more preferably below 380° C. On the other hand, even if the steel sheet is held at a temperature below 200° C., the low temperature range forming bainite is not formed, therefore carbon content in γ lowers, the residual γ amount cannot be secured, and the quenched martensite is formed in a large amount. Accordingly, the strength becomes high, a balance of the elongation, stretch flange formability and bending properties deteriorates. Also, because the carbon content in γ lowers and the residual γ amount cannot be secured, the elongation cannot be increased. Therefore, the lower limit of the T2 temperature range is to be 200° C., preferably 250° C., and more preferably 280° C.

The holding time to hold the steel sheet in the T2 temperature range satisfying the inequality (2) is to be made 200 s or above. When the holding time is below 200 s, the formation amount of the low temperature range forming bainite and the like decreases, the carbon content in γ lowers, the residual γ amount cannot be secured, the quenched martensite is formed in a large amount, therefore the strength becomes high, and a balance of the elongation, stretch flange formability and bending properties deteriorates. Also, because concentration of carbon is not promoted, the formation amount of the residual γ decreases, and the elongation cannot be improved. Further, because the coarse MA mixture phase formed in the T1 temperature range cannot be miniaturized, the stretch flange formability and bending properties cannot be improved. Accordingly, the holding time is to be 200 s or above, preferably 250 s or above, and more preferably 300 s or above. Although the upper limit of the holding time is not particularly limited, when the steel sheet is held for a long time, the concentrated carbon precipitates as the carbide, the residual γ cannot be formed, and the elongation deteriorates in addition to deterioration of productivity. Accordingly, the upper limit of the holding time can be 1,800 s for example.

According to the present invention, the holding time in the T2 temperature range means the time from the time point when the surface temperature of the steel sheet reaches the upper limit of the T2 temperature range until the time point of reaching the lower limit, and specifically is the time from the time point of reaching the temperature below 400° C. until the time point of reaching 200° C.

The method for holding the steel sheet in the T2 temperature range satisfying the inequality (2) is not particularly limited as far as the residence time in the T2 temperature range is 200 or above, and the steel sheet may be isothermally held as the heat pattern within the T1 temperature range, and may also be cooled or heated within the T2 temperature range.

The technology according to the present invention can be suitably adopted particularly for a thin steel sheet with the thickness of 3 mm or below.

On the surface of the cold-rolled steel sheet, a hot-dip galvanizing layer or a hot-dip galvannealing layer may be formed. The condition with which the hot-dip galvanizing layer or the hot-dip galvannealing layer is formed is not particularly limited and a publicly known conditions can be adopted.

The cold-rolled steel sheet in relation with the present invention has the tensile strength of 980 MPa or above and is excellent in the overall workability. The cold-rolled steel sheet can be suitably used for a raw material of structural components for automobiles. As the structural components for automobiles, for example, anti-collision components such as front and rear side members and crash box to begin with, vehicular body constitution components such as a reinforcement material such as a pillar and the like (for example, center pillar reinforce), a reinforcement material of a roof rail, a side sill, floor member and kick part, shock absorbing components such as a reinforcement material for a bumper and a door impact beam, and seat components and the like can be cited. Also, because the cold-rolled steel sheet is excellent in the warm workability, it can be suitably used also as a raw material for warm forming. In this regard, warm working means forming in a temperature range of approximately 50-500° C.

EXAMPLES

Although aspects of the invention will be explained below further specifically referring to examples, the invention is not to be limited by the examples below, and can of course be implemented with modifications added appropriately within the scope adaptable to the purposes described previously and later, and any of them is to be included within the technical range of the invention.

The steel with componential compositions shown in Table 1 below (remainder is iron with inevitable impurities) was smelted in vacuum, and slabs for experiment were manufactured. Based on the componential compositions shown in Table 1 below and the equation (a), $A_{C3}$ points were calculated, and the result was also shown in Table 1 below. Also, the temperatures of $A_{C3}$ points calculated were shown in Table 2-Table 4 below also.

The slabs for experiments obtained were cold rolled after hot rolling was performed, then were continuously annealed, and specimens were manufactured. Specific conditions are as described below.

The slabs for experiments were held for heating at 1,250° C. for 30 min, were thereafter hot rolled so that the finish rolling temperature became 920° C. with approximately 90% draft, were cooled at the average cooling rate of 30° C./s from the temperature to the winding temperature of 500° C., and were wound. After the steel sheets were wound, they were held at the winding temperature (500° C.) for 30 min, were then cooled in a furnace to the room temperature, and hot-rolled steel sheets with 2.6 mm thickness were manufactured.

The hot-rolled steel sheets obtained were acid-washed for removing the surface scale, were cold rolled with the cold rolling ratio of 46%, and cold-rolled steel sheets with 1.4 mm thickness were manufactured.

The cold-rolled steel sheets obtained were heated to the temperatures (° C.) shown in Table 2-Table 4 below, were held for the time shown in Table 2-Table 4 below for soaking, were thereafter cooled according to any of four patterns described below, were continuously annealed, and specimens were manufactured.

(Cooling Pattern i; Corresponding to (i) in the FIG. 3)

After soaking, the steel sheets were cooled at the average cooling rate (° C./s) shown in Table 2-Table 4 below to the starting temperature T (° C.) shown in Table 2-Table 4 below, were thereafter held at the starting temperature T for the time (s; step time) shown in Table 2-Table 4 below, were then cooled to the starting time (° C.) in the T2 temperature range shown in Table 2-Table 4, and were held at the starting temperature. In Table 2-Table 4 below, the residence time (s) in the T1 temperature range and the residence time (s) in the T2 temperature range were shown. Also, the time (s) from the time point when holding of the steel sheet in the T1 temperature range finished to the time point of reaching the starting time in the T2 temperature range was shown.

(Cooling Pattern ii; Corresponding to (ii) in the FIG. 3)

After soaking, the steel sheets were cooled at the average cooling rate (° C./s) shown in Table 2-Table 4 below to the starting temperature T (° C.) shown in Table 2-Table 4 below, were thereafter cooled to the finishing temperature (° C.) shown in Table 2-Table 4 below through the step time (s) shown in Table 2-Table 4 below, were then cooled to the starting temperature (° C.) in the T2 temperature range shown in Table 2-Table 4 below, and were held at the starting temperature for the time (s) shown in Table 2-Table 4 below. In Table 2-Table 4 below, the residence time (s) in the T1 temperature range and the residence time (s) in the T2 temperature range were shown. Also, the time (s) from the time point when holding of the steel sheet in the T1 temperature range finished to the time point of reaching the starting temperature in the T2 temperature range was shown.

(Cooling Pattern iii; Corresponding to (iii) in the FIG. 3)

After soaking, the steel sheets were cooled at the average cooling rate (° C./s) shown in Table 2-Table 4 below to the starting temperature T (° C.) shown in Table 2-Table 4 below, were thereafter cooled to the starting temperature (° C.) in the T2 temperature range shown in Table 2-Table 4 below, and were held at the starting temperature. In Table 2-Table 4 below, the residence time (s) in the T1 temperature range and the residence time (s) in the T2 temperature range were shown.

(Cooling Pattern iv)

After soaking, the steel sheets were cooled to the starting temperature (° C.) in the T1 temperature range or the starting temperature (° C.) in the T2 temperature range shown in Table 2-Table 4 below, and were held at either starting temperature. In Table 2-Table 4 below, the residence time (s) in the T1 temperature range and the residence time (s) in the T2 temperature range were shown.

Also, in Table 2-Table 4 below, the heat pattern as shown in (i) and (ii) in FIG. 3 in which the steel sheet is cooled from the temperature of $A_{C3}$ point or above to an optional temperature T satisfying the inequality (1), is thereafter either isothermally held or cooled within the T1 temperature range, and is then cooled to an optional temperature satisfying the inequality (2) is shown as "step cooling", whereas the heat pattern as shown in (iii) in FIG. 3 in which the steel sheet is cooled from the temperature of $A_{C3}$ point or above to an optional temperature T satisfying the inequality (1) with the cooling rate being thereafter changed, and is then cooled to an optional temperature satisfying the inequality (2) is shown as "slow cooling".

With respect to the specimens obtained, the metallurgical structure was observed and the mechanical properties were evaluated according to the procedures described below.

<Observation of Metallurgical Structure>

Out of the metallurgical structure, the area ratio of the high temperature range forming bainite and the low temperature range forming bainite and the like (that is, low temperature range forming bainite+tempered martensite) was calculated by observation with a scanning electron microscope, and the volumetric ratio of the residual γ was measured by a saturation magnetization method.

[(1) Area Ratio of High Temperature Range Forming Bainite and Low Temperature Range Forming Bainite and the Like]

With respect to the cross-section parallel to the rolling direction of the specimen, the surface was polished, was further subjected to electrolytic polishing, and was thereafter subjected to nital etching, and the ¼ position of the sheet thickness was observed by a SEM with 3,000 times magnification for 5 visual fields. The observation visual field was made approximately 50 μm×50 μm.

Next, the average distance between the residual γ and the carbide observed in the white color or the gray color in the observation visual field was measured by the method described above. The area ratio of the high temperature range forming bainite and the low temperature range forming bainite and the like discriminated by these average distances was measured by a point counting method.

In Table 5 and Table 6 below, the area ratio a (%) of the high temperature range forming bainite and the total area ratio b (%) of the low temperature range forming bainite and the tempered martensite are shown. Further, the total of the area ratio a and the total area ratio b (a+b) is also shown.

[(2) Volumetric Ratio of Residual γ]

Out of the metallurgical structure, the volumetric ratio of the residual γ was measured by a saturation magnetization method. More specifically, saturated magnetization (I) of the specimen and saturated magnetization (Is) of a standard sample that was heat-treated at 400° C. for 15 hrs were measured, and the volumetric ratio ($V_{γr}$) of the residual γ was obtained by the equation below. Saturated magnetization was measured at the room temperature using D.C. magnetization B-H characteristics automatic recording device "Model BHS-40" made by Riken Denshi, Co., Ltd. with maximum applied magnetization of 5,000 (Oe).

$$V_{γr}=(1-I/Is) \times 100$$

Also, with respect to the MA mixture phase in which the residual γ and the quenched martensite were compounded, the number ratio of the MA mixture phase whose equivalent circle diameter d of the observed cross-section exceeded 3 μm to the number of all MA mixture phase was measured by the procedures described below. The surface of the cross-section parallel to the rolling direction of the specimen was polished, was observed using an optical microscope with 1,000 times magnification for 5 visual fields, and the equivalent circle diameter d of the MA mixture phase was measured. The number ratio of the MA mixture phase whose equivalent circle diameter d in the observed cross-section exceeded 3 μm to the number of the MA mixture phase observed was calculated. The case the number ratio was below 15% was deemed to have passed (○), the case 15% or above was deemed to have failed (×), and the result of evaluation was shown in Table 5 and Table 6 below.

Also with respect to the average equivalent circle diameter D of the former γ grains, the crystal orientation of 100 μm×100 μm area of the observation visual field was measured for 3 visual fields with 0.1 μm step by SEM-EBSP method, thereafter the relation between the crystal orientation of neighboring measuring points was analyzed to identify the former γ grain boundary, and the average equivalent circle diameter D of the former γ grains was calculated based on it by a comparison method. Also, CI value in orientation analysis condition by EBSP method was made 0.1 or above.

Figure 4:
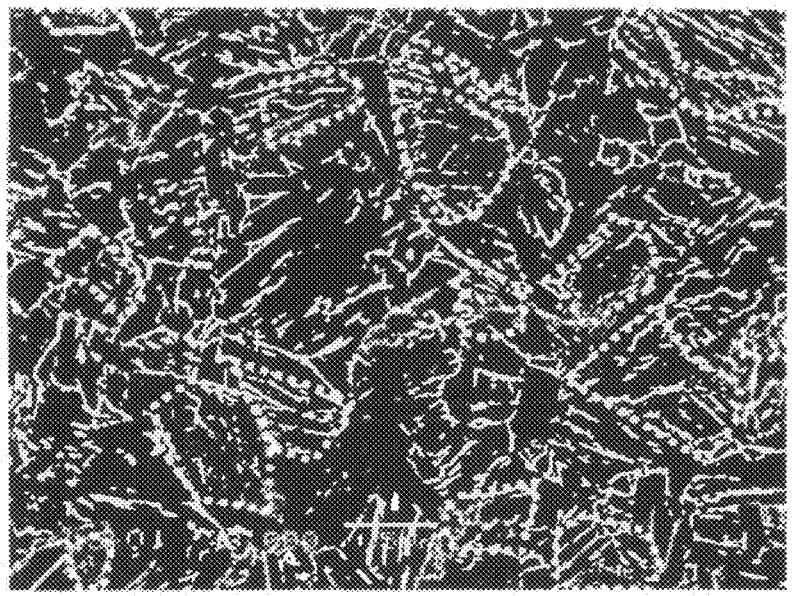
FIG. 4 is a photo taken by a scanning electron microscope for No. 2 shown in Table 2 below (a photo substituted for a drawing).
Figure 5:
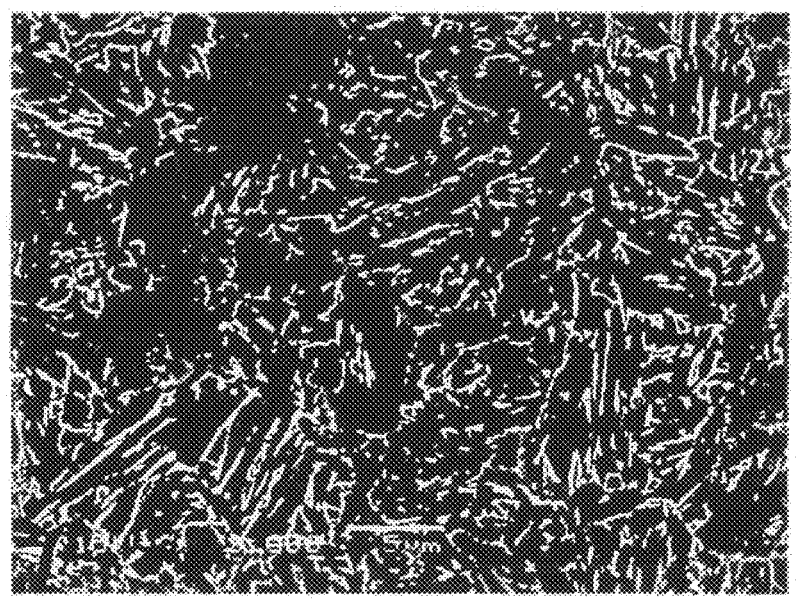
FIG. 5 is a photo taken by a scanning electron microscope for No. 4 shown in Table 2 below (a photo substituted for a drawing).

A photo taken by the scanning electron microscope (a photo substituted for a drawing) for No. 2 (example of the present invention) shown in Table 2 below is shown in FIG. 4 and a photo taken by the scanning electron microscope (a photo substituted for a drawing) for No. 4 (comparative example) shown in Table 2 below is shown in FIG. 5.

In FIG. 4, the area surrounded by a dotted line is that of the composite structure of the low temperature range forming bainite and the tempered martensite, and it is known that both structures of the high temperature range forming bainite and the low temperature range forming bainite and the like have been formed in the example according to the present invention. On the other hand, in FIG. 5, formation of such composite structure as described above cannot be seen, and is known that the construction is of single bainitic structure.

<Evaluation of Mechanical Properties>

The mechanical properties of the specimen were evaluated based on the tensile strength (TS), elongation (EL), bore expandability ratio (λ), and critical bending radius (R).

(1) The tensile strength (TS) and elongation (EL) were measured by a tensile test according to JIS Z2241 using No. 5 test piece stipulated in JIS Z 2201 cut out from the specimen. The test piece was cut out so that the direction perpendicular to the rolling direction of the specimen became the longitudinal direction. The result of measurement is shown in Table 7 and Table 8 below.

(2) The bore expandability ratio (λ) was measured by a bore expandability test according to The Japan Iron and Steel Federation Standards JFST 1001. The result of measurement is shown in Table 7 and Table 8 below.

(3) The critical bending radius (R) was measured by a V-bending test. More specifically, a No. 1 test piece (sheet thickness: 1.4 mm) stipulated in JIS Z 2204 was cut out so that the direction perpendicular to the rolling direction of the specimen became the longitudinal direction (the ridge line of bending was directed so as to agree with the rolling direction), and the V-bending test was performed according to JIS Z2248. Also, in order to prevent occurrence of a crack, the V-bending test was performed after the end faces of the test piece in the longitudinal direction were subjected to mechanical grinding.

The bending test was performed with the angle between a die and a punch of 60° and changing the tip radius of the punch in units of 0.5 mm, and the tip radius of the punch with which the test piece could be bent without causing a crack was obtained as the critical bending radius (R). The result of measurement is shown in Table 7 and Table 8 below. Also, presence/absence of the crack was observed using a magnifying glass, and judgment was made with a criterion of the event the hair crack did not occur.

The mechanical properties of the specimen were evaluated by the criteria of the elongation (EL), bore expandability ratio (λ) and critical bending radius (R) according to the tensile strength (TS). In other words, because required EL, λ and R are different according to TS of the steel sheet, the mechanical properties were evaluated in accordance with the criteria described below according to the TS level.

Based on the evaluation criteria described below, the case in which all properties of EL, λ and R were satisfied was deemed to have passed (○), the case any of the properties was not satisfied was deemed to have failed (×), and the result of evaluation was shown in Table 7 and Table 8 below.

(1) In the Case of 980 MPa Class
TS: 980 MPa or above and below 1,180 MPa
EL: 16% or above
λ: 30% or above
TS(MPa)×EL(%)×λ(%)/1,000: 700 or above
R: 1.5 mm or below
(2) In the Case of 1,180 MPa Class
TS: 1,180 MPa or above and below 1,270 MPa
EL: 14% or above
λ: 25% or above
TS(MPa)×EL(%)×λ(%)/1,000: 600 or above
R: 2.5 mm or below
(3) In the Case of 1,270 MPa Class
TS: 1,270 MPa or above and below 1,370 MPa
EL: 12% or above
λ: 20% or above
TS(MPa)×EL(%)×λ(%)/1,000: 500 or above
R: 3.5 mm or below Also, the present invention is premised on TS of 980 MPa or above, and the case in which TS is below 980 MPa is to be regarded to be out of the object even if EL, λ and R are excellent.

The following consideration is possible from Table 1-Table 8 below.

Out of Nos. 1-67 shown in Table 2-Table 4 below, Nos. 1, 5, 12, 31, 43-47, 57-59, 62, 63 are the examples in which the steel sheet was cooled according to the pattern i stipulated in the present invention, Nos. 6, 13, 14, 27, 28 are the examples in which the steel sheet was cooled according to the pattern iii stipulated in the present invention, Nos. 4, 11, 38 are the examples in which the steel sheet was cooled according to the pattern iv that deviated from the requirement of the present invention, and the remainder are the examples in which the steel sheet was cooled according to the pattern ii stipulated in the present invention.

All of the examples marked with 0 in the overall evaluation in Table 7 and Table 8 below are those of the cold-rolled steel sheets satisfying the requirement stipulated in the present invention, and satisfy the criteria value of the mechanical properties (EL, λ and R) decided according to each TS. Accordingly, it is known that the high-strength cold-rolled steel sheet according to the present invention is excellent on the overall workability.

On the other hand, the examples marked with × in the overall evaluation are those of the cold-rolled steel sheets not satisfying any of the requirement stipulated in the present invention. The detail is as described below.

No. 3, No. 10 and No. 47 are the examples in which the heating and the soaking temperatures were too low because they were below the temperature of $A_{C3}$ point, and are the examples in which the steel sheets were annealed in a two phase region. As a result, because the fraction of the ferrite increased and formation of the high temperature range forming bainite and the low temperature range forming bainite and the like was inhibited, TS lowered.

No. 4 and No. 11 are the examples in which the steel sheet was isothermally processed, was thereafter cooled to the T1 temperature range, and was held at the temperature. Because the steel sheet was held only in the T1 temperature range, the holding time in the T2 temperature range was too short, the low temperature range forming bainite and the like was hardly formed, the coarse MA mixture phase was formed in a large amount, therefore λ was less than the criterion value, and the bore expandability was not improved.

No. 7 is the example in which the holding time in the T2 temperature range was too short, and therefore formation of the low temperature range forming bainite and the like was inhibited. Accordingly, EL was less than the criterion value, and the elongation was not improved. Also, R was larger than the criterion value, and the bending properties could not be improved. Also, because the coarse MA mixture phase was formed in a large amount, λ satisfied the criterion value, however a balance of EL and λ deteriorated, and the bending properties also lowered.

No. 14 is the example in which the holding time in the T1 temperature range was too long, and therefore the formation ratio of the low temperature range forming bainite was low, and the coarse MA mixture phase was formed in a large amount. Accordingly, A became less than the criterion value, and the bore expandability could not be improved. Also, the balance of EL and A was deteriorated. No. 15 is the example in which the holding time in the T2 temperature range was too short, and therefore formation of the low temperature range forming bainite and the like was inhibited. Because the coarse MA mixture phase was formed in a large amount, R became larger than the criterion value, and the bending properties could not be improved. Further, the balance of EL and A was also deteriorated.

No. 28 and No. 29 are the examples in which the holding time in the T1 temperature range was too short. As a result that formation of the high temperature range forming bainite was inhibited, EL lowered, and the workability could not be improved.

In No. 30, although the residence time in T1 was satisfied, the rapid cooling termination temperature (step starting temperature) exceeded 540° C., therefore the ferrite was formed in a large amount, and formation of the high temperature range forming bainite and the low temperature range forming bainite and the like was inhibited. Accordingly, TS lowered.

No. 31 is the example in which after the steel sheet was soaked, it was not held in the T1 temperature range but was held only in the T2 temperature range, formation of the high temperature range forming bainite was inhibited, EL lowered, and the workability could not be improved.

No. 34 and No. 52 are the examples in which the average cooling rate after soaking was too low, ferritic transformation occurred in cooling, and formation of the high temperature range forming bainite and the low temperature range forming bainite and the like was inhibited. As a result, TS lowered.

Both of No. 35 and No. 53 are the examples in which the holding time in the T1 temperature range was short. Because the formation amount of the high temperature range forming bainite was less, EL lowered.

No. 36, No. 39, No. 54, and No. 55 are the examples in which the holding time in the T1 temperature range was too long, and formation of the low temperature range forming bainite and the like was inhibited. Accordingly, the coarse MA mixture phase was formed in a large amount, and λ lowered.

No. 38 is the example in which after the steel sheet was soaked, it was cooled to the T2 temperature range, and was held at the temperature. Because it was held only in the T2 temperature range, the high temperature range forming bainite was almost not formed, EL became less than the criterion value, and the elongation could not be improved.

No. 40 is the example in which the steel sheet was held only in the T1 temperature range, and was not held in the T2 temperature range. Accordingly, formation of the low temperature range forming bainite and the like was inhibited, the coarse MA mixture phase was formed in a large amount, and therefore λ lowered.

No. 41 is the example in which the steel sheet was held at a temperature below the T2 temperature range and the holding time in the T2 temperature range was too short. Accordingly, formation of the low temperature range forming bainite was inhibited, El lowered, and the workability could not be improved.

No. 44 is the example in which the soaking time was too short, conversion to austenite single phase was impossible, and therefore the remained ferrite and the ferrite formed during cooling were added which resulted that the formation amount of the ferrite increased and the formation amount of the high temperature range forming bainite and the low temperature range forming bainite and the like decreased. As a result, TS lowered.

Nos. 64-67 are the examples in which the componential composition of the steel sheet did not satisfy the requirement stipulated in the present invention, and the criteria value of the mechanical properties (EL, λ, R) according to each TS were not satisfied whose detail will be described below.

No. 64 is the example in which C content was too low, TS was below 980 MPa, and the required strength could not be secured.

No. 65 is the example in which Si content was too much, formation of the high temperature range forming bainite and the low temperature range forming bainite and the like was inhibited, therefore TS was below 980 MPa, and the strength was not sufficient.

Although No. 66 is the example in which TS of 980 MPa class could be attained, because Si content was too low, the formation amount of the residual γ could not be secured. Accordingly, EL lowered.

No. 67 is the example in which Mn content was too low, quenching could not be performed sufficiently, therefore the ferrite was formed during cooling, and formation of the high temperature range forming bainite and the low temperature range forming bainite and the like was inhibited. Accordingly, TS became below 980 MPa, and the strength was not sufficient.

From the results described above, it is known that the high-strength cold-rolled steel sheet with the improved overall workability can be provided according to the present invention.

Next, the product of the tensile strength (TS) times the elongation (EL) shown in Table 7 and Table 8 below (TS×EL) was calculated, and the relation between the value of the product and the bore expandability ratio (λ) was shown in FIG. 6. In FIG. 6, ● represents the result in which the average equivalent circle diameter D of the former γ grains was 20 μm or below, and Δ represents the result in which the average equivalent circle diameter D of the former γ grains exceeded 20 μm.

As is clear from FIG. 6, even if the value of TS×EL is equal, the bore expandability ratio (λ) can be increased and the workability can be improved by limiting the average equivalent circle diameter D of the former γ grains to 20 μm or below.

TABLE 1

| Steel kind | Componential composition (mass %) | | | | | | | | | | | |
|---|---|---|---|---|---|---|---|---|---|---|---|---|
| | C | Si | Mn | P | S | Al | Cr | Mo | Ti | Nb | V | Cu |
| a | 0.17 | 1.41 | 2.29 | 0.02 | 0.001 | 0.04 | — | — | — | — | — | — |
| b | 0.17 | 1.78 | 2.28 | 0.03 | 0.002 | 0.04 | — | — | — | — | — | — |
| c | 0.17 | 2.18 | 2.31 | 0.03 | 0.001 | 0.05 | — | — | — | — | — | — |
| d | 0.17 | 1.85 | 1.89 | 0.03 | 0.002 | 0.03 | 0.3 | — | — | — | — | — |
| e | 0.17 | 1.82 | 2.09 | 0.02 | 0.001 | 0.04 | — | 0.2 | — | — | — | — |
| f | 0.17 | 2.02 | 2.22 | 0.02 | 0.002 | 0.04 | — | — | 0.08 | — | — | — |
| g | 0.17 | 1.98 | 2.21 | 0.01 | 0.002 | 0.02 | — | — | 0.03 | 0.04 | — | — |
| h | 0.16 | 2.01 | 2.26 | 0.03 | 0.002 | 0.05 | — | — | 0.03 | — | 0.06 | — |
| i | 0.17 | 1.82 | 2.01 | 0.01 | 0.001 | 0.03 | — | — | — | — | — | 0.34 |
| j | 0.18 | 1.77 | 1.95 | 0.01 | 0.002 | 0.05 | — | — | 0.02 | — | — | — |
| k | 0.17 | 2.00 | 2.23 | 0.02 | 0.002 | 0.03 | — | — | — | — | — | — |
| l | 0.17 | 2.02 | 2.05 | 0.01 | 0.002 | 0.03 | — | — | — | — | — | — |
| m | 0.20 | 1.78 | 2.25 | 0.03 | 0.001 | 0.02 | — | — | — | — | — | — |
| n | 0.15 | 1.92 | 2.25 | 0.01 | 0.001 | 0.05 | — | — | — | — | — | — |
| o | 0.13 | 2.15 | 2.50 | 0.01 | 0.002 | 0.03 | — | — | — | — | — | — |
| p | 0.12 | 2.78 | 2.54 | 0.02 | 0.001 | 0.04 | — | — | — | — | — | — |
| q | 0.17 | 1.38 | 1.67 | 0.03 | 0.001 | 0.04 | 0.5 | 0.2 | — | — | — | — |
| r | 0.23 | 2.31 | 2.26 | 0.02 | 0.002 | 0.05 | — | — | — | — | — | — |

TABLE 1-continued

| | | | | | | | | | | | |
|---|---|---|---|---|---|---|---|---|---|---|---|
| s | 0.25 | 1.76 | 2.47 | 0.02 | 0.001 | 0.04 | — | — | — | — | — |
| t | 0.14 | 1.55 | 2.24 | 0.02 | 0.002 | 0.02 | — | — | — | — | — |
| u | 0.20 | 1.92 | 2.58 | 0.01 | 0.001 | 0.03 | — | — | 0.05 | — | — |
| v | 0.28 | 1.55 | 2.33 | 0.01 | 0.002 | 0.02 | — | — | — | — | — |
| w | 0.17 | 2.65 | 2.85 | 0.02 | 0.002 | 0.04 | — | — | — | — | — |
| x | 0.19 | 2.02 | 2.59 | 0.03 | 0.001 | 0.04 | 0.6 | — | 0.07 | — | 0.12 |
| y | 0.23 | 2.31 | 2.43 | 0.02 | 0.002 | 0.03 | — | 0.3 | 0.02 | — | — |
| α | 0.08 | 1.88 | 2.24 | 0.02 | 0.001 | 0.04 | — | — | — | — | — |
| β | 0.15 | 3.22 | 2.18 | 0.02 | 0.002 | 0.04 | — | — | — | — | — |
| γ | 0.17 | 0.45 | 2.27 | 0.01 | 0.001 | 0.04 | — | — | — | — | — |
| δ | 0.17 | 1.81 | 1.27 | 0.02 | 0.002 | 0.02 | — | — | — | — | — |

| Steel kind | Componential composition (mass %) | | | | | | | Ac₃ point (° C.) |
|---|---|---|---|---|---|---|---|---|
| | Ni | B | Ca | Mg | REM | N | O | |
| a | — | — | — | — | — | 0.003 | 0.001 | 852 |
| b | — | — | — | — | — | 0.004 | 0.001 | 874 |
| c | — | — | — | — | — | 0.004 | 0.001 | 895 |
| d | — | — | — | — | — | 0.004 | 0.001 | 883 |
| e | — | — | — | — | — | 0.003 | 0.001 | 882 |
| f | — | — | — | — | — | 0.005 | 0.001 | 912 |
| g | — | — | — | — | — | 0.003 | 0.001 | 876 |
| h | — | — | — | — | — | 0.004 | 0.001 | 910 |
| i | 0.38 | — | — | — | — | 0.002 | 0.002 | 854 |
| j | — | 0.0022 | — | — | — | 0.004 | 0.001 | 879 |
| k | — | — | 0.0025 | 0.0013 | 0.0015 | 0.004 | 0.001 | 875 |
| l | — | — | 0.0035 | — | 0.0022 | 0.002 | 0.001 | 874 |
| m | — | — | — | — | — | 0.003 | 0.001 | 860 |
| n | — | — | — | — | — | 0.004 | 0.001 | 877 |
| o | — | — | — | — | — | 0.003 | 0.001 | 877 |
| p | — | — | — | — | — | 0.004 | 0.001 | 918 |
| q | — | — | — | — | — | 0.003 | 0.001 | 877 |
| r | — | — | — | — | — | 0.003 | 0.001 | 882 |
| s | — | — | — | — | — | 0.003 | 0.001 | 843 |
| t | — | — | — | — | — | 0.004 | 0.001 | 858 |
| u | — | — | — | — | — | 0.003 | 0.001 | 867 |
| v | — | — | — | — | — | 0.003 | 0.001 | 817 |
| w | — | — | — | — | — | 0.003 | 0.001 | 889 |
| x | 0.11 | — | — | — | — | 0.002 | 0.001 | 889 |
| y | — | 0.0025 | 0.0022 | — | 0.0021 | 0.002 | 0.002 | 886 |
| α | — | — | — | — | — | 0.003 | 0.001 | 899 |
| β | — | — | — | — | — | 0.004 | 0.001 | 941 |
| γ | — | — | — | — | — | 0.004 | 0.001 | 801 |
| δ | — | — | — | — | — | 0.003 | 0.001 | 891 |

TABLE 2

| No. | Steel kind | Ac₃ point (° C.) | Soaking | | | T1 Temperature range | | | Time between T1 and T2 (s) | T2 temperature range | Residence time (s) | | Cooling pattern | Remarks |
|---|---|---|---|---|---|---|---|---|---|---|---|---|---|---|
| | | | Heating temperature (° C.) | Holding time (s) | Average cooling rate (° C./s) | Starting temperature T (° C.) | Finishing temperature (° C.) | Step time (s) | | Starting temperature (° C.) | T1 Temperature range | T2 Temperature range | | |
| 1 | a | 852 | 930 | 200 | 80 | 420 | 420 | 20 | 4 | 380 | 24 | 638 | i | Step |
| 2 | b | 874 | 930 | 200 | 80 | 450 | 420 | 20 | 4 | 380 | 23 | 638 | ii | Step |
| 3 | b | 874 | 860 | 200 | 80 | 450 | 420 | 20 | 4 | 380 | 23 | 638 | ii | Step |
| 4 | b | 874 | 930 | 200 | 80 | 420 | — | — | — | — | 606 | 40 | iv | — |
| 5 | b | 874 | 930 | 200 | 80 | 420 | 420 | 20 | 4 | 380 | 24 | 638 | i | Step |
| 6 | b | 874 | 930 | 200 | 80 | 450 | — | 20 | — | 380 | 15 | 642 | iii | Slow cooling |
| 7 | b | 874 | 930 | 200 | 80 | 450 | 420 | 20 | 4 | 380 | 23 | 188 | ii | Step |
| 8 | c | 895 | 930 | 200 | 80 | 480 | 450 | 20 | 4 | 380 | 24 | 637 | ii | Step |
| 9 | c | 895 | 930 | 200 | 80 | 520 | 450 | 20 | 4 | 380 | 23 | 637 | ii | Step |
| 10 | c | 895 | 860 | 200 | 80 | 480 | 450 | 20 | 4 | 380 | 24 | 637 | ii | Step |
| 11 | c | 895 | 930 | 200 | 80 | 420 | — | — | — | — | 606 | 40 | iv | — |
| 12 | c | 895 | 930 | 200 | 80 | 450 | 450 | 20 | 4 | 380 | 24 | 637 | i | Step |
| 13 | c | 895 | 930 | 200 | 80 | 480 | — | 20 | — | 380 | 17 | 640 | iii | Slow cooling |
| 14 | c | 895 | 930 | 200 | 80 | 450 | — | 200 | — | 380 | 144 | 693 | iii | Slow cooling |
| 15 | c | 895 | 930 | 200 | 80 | 480 | 450 | 20 | 4 | 380 | 24 | 187 | ii | Step |

TABLE 2-continued

| No. | Steel kind | Ac₃ point (° C.) | Soaking Heating temperature (° C.) | Soaking Holding time (s) | Average cooling rate (° C./s) | T1 Temperature range Starting temperature T (° C.) | T1 Temperature range Finishing temperature (° C.) | Step time (s) | Time between T1 and T2 (s) | T2 temperature range Starting temperature (° C.) | Residence time (s) T1 Temperature range | Residence time (s) T2 Temperature range | Cooling pattern | Remarks |
|---|---|---|---|---|---|---|---|---|---|---|---|---|---|---|
| 16 | d | 883 | 930 | 200 | 80 | 450 | 420 | 60 | 4 | 380 | 63 | 938 | ii | Step |
| 17 | e | 882 | 930 | 200 | 80 | 480 | 450 | 60 | 4 | 380 | 64 | 937 | ii | Step |
| 18 | f | 912 | 930 | 200 | 80 | 480 | 450 | 60 | 4 | 380 | 64 | 937 | ii | Step |
| 19 | g | 876 | 930 | 200 | 80 | 480 | 450 | 60 | 4 | 380 | 64 | 937 | ii | Step |
| 20 | h | 910 | 930 | 200 | 80 | 480 | 450 | 60 | 4 | 380 | 64 | 937 | ii | Step |
| 21 | i | 854 | 930 | 200 | 80 | 480 | 450 | 60 | 4 | 380 | 64 | 937 | ii | Step |
| 22 | j | 879 | 930 | 200 | 80 | 480 | 450 | 90 | 4 | 380 | 94 | 937 | ii | Step |

TABLE 3

| No. | Steel kind | Ac₃ point (° C.) | Soaking Heating temperature (° C.) | Soaking Holding time (s) | Average cooling rate (° C./s) | T1 Temperature range Starting temperature T (° C.) | T1 Temperature range Finishing temperature (° C.) | Step time (s) | Time between T1 and T2 (s) | T2 temperature range Starting temperature (° C.) | Residence time (s) T1 Temperature range | Residence time (s) T2 Temperature range | Cooling pattern | Remarks |
|---|---|---|---|---|---|---|---|---|---|---|---|---|---|---|
| 23 | k | 875 | 930 | 200 | 80 | 480 | 450 | 20 | 4 | 380 | 24 | 637 | ii | Step |
| 24 | k | 875 | 930 | 200 | 80 | 520 | 420 | 20 | 4 | 380 | 22 | 938 | ii | Step |
| 25 | k | 875 | 930 | 200 | 80 | 450 | 420 | 20 | 4 | 290 | 22 | 921 | ii | Step |
| 26 | k | 875 | 930 | 200 | 80 | 450 | 420 | 5 | 4 | 320 | 7 | 927 | ii | Step |
| 27 | k | 875 | 930 | 200 | 80 | 480 | — | 20 | — | 380 | 17 | 940 | iii | Slow cooling |
| 28 | k | 875 | 930 | 200 | 80 | 450 | — | 5 | — | 350 | 4 | 933 | iii | Slow cooling |
| 29 | k | 875 | 930 | 200 | 80 | 480 | 380 | 4 | 4 | 350 | 4 | 634 | ii | Step |
| 30 | k | 875 | 930 | 200 | 80 | 580 | 520 | 20 | 4 | 380 | 10 | 637 | ii | Step |
| 31 | k | 875 | 930 | 200 | 80 | 350 | 350 | 20 | 4 | 280 | 2 | 620 | i | Step |
| 32 | l | 874 | 930 | 200 | 80 | 480 | 450 | 20 | 4 | 380 | 24 | 637 | ii | Step |
| 33 | l | 874 | 930 | 200 | 80 | 450 | 420 | 20 | 4 | 290 | 22 | 921 | ii | Step |
| 34 | l | 874 | 930 | 200 | 5 | 480 | 450 | 20 | 4 | 380 | 35 | 637 | ii | Step |
| 35 | l | 874 | 930 | 200 | 100 | 480 | 450 | 2 | 2 | 380 | 4 | 637 | ii | Step |
| 36 | l | 874 | 930 | 200 | 80 | 480 | 450 | 300 | 4 | 380 | 304 | 637 | ii | Step |
| 37 | m | 860 | 930 | 200 | 80 | 480 | 450 | 20 | 4 | 380 | 24 | 637 | ii | Step |
| 38 | m | 860 | 930 | 200 | 80 | — | — | — | — | 380 | 2 | 636 | iv | — |
| 39 | m | 860 | 930 | 200 | 80 | 480 | 450 | 20 | 150 | 380 | 128 | 679 | ii | Step |
| 40 | m | 860 | 930 | 200 | 80 | 480 | 450 | 20 | 4 | 440 | 629 | 40 | ii | Step |
| 41 | m | 860 | 930 | 200 | 80 | 480 | 450 | 20 | 4 | 150 | 21 | 3 | ii | Step |
| 42 | m | 860 | 960 | 200 | 80 | 480 | 450 | 20 | 4 | 380 | 24 | 637 | ii | Step |
| 43 | n | 877 | 930 | 200 | 80 | 420 | 420 | 20 | 4 | 380 | 24 | 638 | i | Step |
| 44 | n | 877 | 930 | 20 | 80 | 420 | 420 | 20 | 4 | 380 | 24 | 638 | i | Step |

TABLE 4

| No. | Steel kind | Ac₃ point (° C.) | Soaking Heating temperature (° C.) | Soaking Holding time (s) | Average cooling rate (° C./s) | T1 Temperature range Starting temperature T (° C.) | T1 Temperature range Finishing temperature (° C.) | Step time (s) | Time between T1 and T2 (s) | T2 temperature range Starting temperature (° C.) | Residence time (s) T1 Temperature range | Residence time (s) T2 Temperature range | Cooling pattern | Remarks |
|---|---|---|---|---|---|---|---|---|---|---|---|---|---|---|
| 45 | o | 877 | 930 | 200 | 80 | 420 | 420 | 20 | 4 | 350 | 23 | 633 | i | Step |
| 46 | p | 918 | 960 | 200 | 80 | 425 | 425 | 20 | 4 | 320 | 22 | 627 | i | Step |
| 47 | p | 918 | 890 | 200 | 80 | 425 | 425 | 20 | 4 | 320 | 22 | 627 | i | Step |
| 48 | q | 877 | 930 | 200 | 80 | 450 | 420 | 60 | 4 | 380 | 63 | 938 | ii | Step |
| 49 | r | 882 | 930 | 200 | 80 | 480 | 450 | 20 | 4 | 380 | 24 | 637 | ii | Step |
| 50 | r | 882 | 930 | 200 | 80 | 520 | 450 | 20 | 4 | 380 | 23 | 637 | ii | Step |
| 51 | r | 882 | 930 | 200 | 80 | 450 | 420 | 20 | 4 | 290 | 22 | 921 | ii | Step |
| 52 | r | 882 | 930 | 200 | 5 | 480 | 450 | 20 | 4 | 380 | 35 | 637 | ii | Step |

TABLE 4-continued

| No. | Steel kind | Ac₃ point (°C.) | Soaking | | | T1 Temperature range | | | Time between T1 and T2 (s) | T2 temperature range Starting temperature (°C.) | Residence time (s) | | Cooling pattern | Remarks |
|---|---|---|---|---|---|---|---|---|---|---|---|---|---|---|
| | | | Heating temperature (°C.) | Holding time (s) | Average cooling rate (°C./s) | Starting temperature T (°C.) | Finishing temperature (°C.) | Step time (s) | | | T1 Temperature range | T2 Temperature range | | |
| 53 | r | 882 | 930 | 200 | 100 | 480 | 450 | 2 | 2 | 380 | 4 | 637 | ii | Step |
| 54 | r | 882 | 930 | 200 | 80 | 480 | 450 | 300 | 4 | 380 | 304 | 637 | ii | Step |
| 55 | r | 882 | 930 | 200 | 80 | 480 | 450 | 20 | 150 | 380 | 128 | 679 | ii | Step |
| 56 | s | 843 | 930 | 200 | 80 | 480 | 450 | 20 | 4 | 380 | 24 | 637 | ii | Step |
| 57 | t | 858 | 930 | 200 | 80 | 425 | 425 | 20 | 4 | 380 | 24 | 638 | i | Step |
| 58 | t | 858 | 930 | 1200 | 80 | 425 | 425 | 20 | 4 | 380 | 24 | 638 | i | Step |
| 59 | u | 867 | 930 | 200 | 80 | 420 | 420 | 20 | 4 | 320 | 22 | 927 | i | Step |
| 60 | v | 817 | 930 | 200 | 80 | 450 | 420 | 10 | 4 | 350 | 12 | 933 | ii | Step |
| 61 | w | 889 | 930 | 200 | 80 | 450 | 420 | 20 | 4 | 350 | 22 | 1233 | ii | Step |
| 62 | x | 889 | 930 | 200 | 80 | 400 | 400 | 60 | 4 | 290 | 62 | 922 | i | Step |
| 63 | y | 886 | 930 | 200 | 80 | 400 | 400 | 60 | 4 | 320 | 62 | 928 | i | Step |
| 64 | α | 899 | 930 | 200 | 80 | 450 | 420 | 20 | 4 | 380 | 23 | 638 | ii | Step |
| 65 | β | 941 | 960 | 200 | 80 | 450 | 420 | 20 | 4 | 380 | 23 | 638 | ii | Step |
| 66 | γ | 801 | 930 | 200 | 80 | 450 | 420 | 20 | 4 | 380 | 23 | 638 | ii | Step |
| 67 | δ | 891 | 930 | 200 | 80 | 450 | 420 | 20 | 4 | 380 | 23 | 638 | ii | Step |

TABLE 5

| No. | Steel kind | Composite structure | | | Residual γ (vol. %) | MA mixture phase number ratio | Former γ grain size (μm) |
|---|---|---|---|---|---|---|---|
| | | Area ratio a (area %) | Area ratio b (area %) | a + b (area %) | | | |
| 1 | a | 41 | 36 | 77 | 11 | ○ | 15 |
| 2 | b | 46 | 39 | 85 | 10 | ○ | 12 |
| 3 | b | 28 | 33 | 61 | 12 | ○ | 5 |
| 4 | b | 73 | 5 | 78 | 11 | X | 12 |
| 5 | b | 42 | 41 | 83 | 10 | ○ | 12 |
| 6 | b | 38 | 46 | 84 | 9 | ○ | 12 |
| 7 | b | 42 | 18 | 60 | 6 | X | 12 |
| 8 | c | 47 | 38 | 85 | 11 | ○ | 9 |
| 9 | c | 53 | 29 | 82 | 12 | ○ | 9 |
| 10 | c | 38 | 27 | 65 | 12 | ○ | 6 |
| 11 | c | 68 | 7 | 75 | 11 | X | 9 |
| 12 | c | 49 | 32 | 81 | 11 | ○ | 9 |
| 13 | c | 44 | 39 | 83 | 10 | ○ | 9 |
| 14 | c | 65 | 8 | 73 | 12 | X | 9 |
| 15 | c | 53 | 17 | 70 | 5 | X | 9 |
| 16 | d | 39 | 37 | 76 | 9 | ○ | 15 |
| 17 | e | 38 | 40 | 78 | 9 | ○ | 15 |
| 18 | f | 41 | 38 | 79 | 9 | ○ | 7 |
| 19 | g | 40 | 38 | 78 | 10 | ○ | 5 |
| 20 | h | 42 | 40 | 82 | 9 | ○ | 7 |
| 21 | i | 35 | 42 | 77 | 12 | ○ | 10 |
| 22 | j | 32 | 49 | 81 | 11 | ○ | 7 |
| 23 | k | 41 | 38 | 79 | 11 | ○ | 10 |
| 24 | k | 49 | 31 | 80 | 12 | ○ | 10 |
| 25 | k | 35 | 49 | 84 | 8 | ○ | 10 |
| 26 | k | 27 | 58 | 85 | 8 | ○ | 10 |
| 27 | k | 37 | 46 | 83 | 10 | ○ | 10 |
| 28 | k | 8 | 79 | 87 | 3 | ○ | 10 |
| 29 | k | 14 | 72 | 86 | 5 | ○ | 10 |
| 30 | k | 23 | 42 | 65 | 7 | ○ | 10 |
| 31 | k | 5 | 82 | 87 | 6 | ○ | 10 |
| 32 | l | 46 | 34 | 80 | 11 | ○ | 10 |
| 33 | l | 38 | 47 | 85 | 8 | ○ | 10 |
| 34 | l | 23 | 37 | 60 | 12 | X | 10 |
| 35 | l | 13 | 74 | 87 | 5 | ○ | 10 |
| 36 | l | 69 | 6 | 75 | 11 | X | 10 |

TABLE 6

| No. | Steel kind | Composite structure Area ratio a (area %) | Area ratio b (area %) | a + b (area %) | Residual γ (vol. %) | MA mixture phase number ratio | Former γ grain size (μm) |
|---|---|---|---|---|---|---|---|
| 37 | m | 43 | 34 | 77 | 12 | ○ | 12 |
| 38 | m | 4 | 82 | 86 | 4 | ○ | 12 |
| 39 | m | 69 | 11 | 80 | 11 | X | 12 |
| 40 | m | 72 | 4 | 76 | 11 | X | 12 |
| 41 | m | 45 | 17 | 62 | 11 | X | 12 |
| 42 | m | 39 | 38 | 77 | 11 | ○ | 32 |
| 43 | n | 45 | 33 | 78 | 10 | ○ | 10 |
| 44 | n | 34 | 32 | 66 | 11 | ○ | 10 |
| 45 | o | 47 | 28 | 75 | 11 | ○ | 10 |
| 46 | p | 41 | 37 | 78 | 10 | ○ | 35 |
| 47 | p | 33 | 32 | 65 | 11 | ○ | 7 |
| 48 | q | 26 | 52 | 78 | 9 | ○ | 12 |
| 49 | r | 41 | 35 | 76 | 12 | ○ | 10 |
| 50 | r | 48 | 31 | 79 | 13 | ○ | 10 |
| 51 | r | 37 | 44 | 81 | 8 | ○ | 10 |
| 52 | r | 24 | 35 | 59 | 12 | ○ | 10 |
| 53 | r | 11 | 69 | 80 | 6 | ○ | 10 |
| 54 | r | 68 | 5 | 73 | 12 | X | 10 |
| 55 | r | 65 | 12 | 77 | 11 | X | 10 |
| 56 | s | 43 | 35 | 78 | 12 | ○ | 12 |
| 57 | t | 43 | 35 | 78 | 10 | ○ | 12 |
| 58 | t | 38 | 39 | 77 | 9 | ○ | 31 |
| 59 | u | 41 | 44 | 85 | 8 | ○ | 12 |
| 60 | v | 48 | 32 | 80 | 12 | ○ | 15 |
| 61 | w | 28 | 55 | 83 | 8 | ○ | 9 |
| 62 | X | 24 | 62 | 86 | 7 | ○ | 9 |
| 63 | y | 25 | 59 | 84 | 8 | ○ | 9 |
| 64 | α | 42 | 44 | 86 | 7 | ○ | 12 |
| 65 | β | 28 | 33 | 61 | 12 | X | 8 |
| 66 | γ | 49 | 46 | 95 | 1 | ○ | 15 |
| 67 | δ | 23 | 31 | 54 | 12 | X | 12 |

TABLE 7

| No. | Steel kind | TS (MPa) | EL (%) | λ (%) | R (mm) | TS × EL × λ/ 1000 | Overall evaluation | Remarks |
|---|---|---|---|---|---|---|---|---|
| 1 | a | 993 | 18 | 62 | 0.0 | 1108 | ○ | 980 MPa class |
| 2 | b | 1002 | 20 | 61 | 0.0 | 1222 | ○ | 980 MPa class |
| 3 | b | 958 | 21 | 32 | 0.0 | 644 | X | Below 980 MPa |
| 4 | b | 984 | 22 | 24 | 1.5 | 520 | X | 980 MPa class |
| 5 | b | 1015 | 19 | 62 | 0.0 | 1196 | ○ | 980 MPa class |
| 6 | b | 1043 | 18 | 65 | 0.0 | 1220 | ○ | 980 MPa class |
| 7 | b | 1071 | 15 | 33 | 2.0 | 530 | X | 980 MPa class |
| 8 | c | 1045 | 20 | 45 | 0.5 | 941 | ○ | 980 MPa class |
| 9 | c | 1027 | 23 | 37 | 0.0 | 874 | ○ | 980 MPa class |
| 10 | c | 963 | 23 | 31 | 0.5 | 687 | X | Below 980 MPa |
| 11 | c | 1065 | 21 | 21 | 1.5 | 470 | X | 980 MPa class |
| 12 | c | 1032 | 21 | 48 | 0.5 | 1040 | ○ | 980 MPa class |
| 13 | c | 1055 | 19 | 55 | 0.5 | 1102 | ○ | 980 MPa class |
| 14 | c | 1071 | 20 | 23 | 1.5 | 493 | X | 980 MPa class |
| 15 | c | 1066 | 16 | 32 | 2.0 | 546 | X | 980 MPa class |
| 16 | d | 1029 | 20 | 52 | 0.5 | 1070 | ○ | 980 MPa class |
| 17 | e | 1035 | 20 | 49 | 0.5 | 1014 | ○ | 980 MPa class |
| 18 | f | 1044 | 19 | 48 | 0.5 | 952 | ○ | 980 MPa class |
| 19 | g | 1041 | 20 | 55 | 0.0 | 1145 | ○ | 980 MPa class |
| 20 | h | 1037 | 19 | 51 | 0.0 | 1005 | ○ | 980 MPa class |
| 21 | i | 1062 | 18 | 57 | 1.0 | 1090 | ○ | 980 MPa class |
| 22 | j | 1075 | 18 | 65 | 0.5 | 1258 | ○ | 980 MPa class |
| 23 | k | 1035 | 20 | 49 | 0.0 | 1014 | ○ | 980 MPa class |
| 24 | k | 1012 | 23 | 35 | 0.0 | 815 | ○ | 980 MPa class |
| 25 | k | 1193 | 17 | 42 | 1.5 | 852 | ○ | 1180 MPa class |
| 26 | k | 1219 | 16 | 44 | 1.5 | 858 | ○ | 1180 MPa class |
| 27 | k | 1068 | 18 | 54 | 0.5 | 1038 | ○ | 980 MPa class |
| 28 | k | 1297 | 10 | 68 | 2.0 | 882 | X | 1270 MPa class |
| 29 | k | 1236 | 12 | 61 | 1.5 | 905 | X | 1180 MPa class |
| 30 | k | 965 | 17 | 25 | 1.5 | 410 | X | Below 980 MPa |
| 31 | k | 1237 | 10 | 59 | 2.0 | 730 | X | 1180 MPa class |
| 32 | l | 988 | 22 | 51 | 0.0 | 1109 | ○ | 980 MPa class |
| 33 | l | 1185 | 17 | 47 | 1.5 | 947 | ○ | 1180 MPa class |
| 34 | l | 963 | 22 | 27 | 0.0 | 572 | X | Below 980 MPa |

TABLE 7-continued

| Steel No. | Steel kind | TS (MPa) | EL (%) | λ (%) | R (mm) | TS × EL × λ/ 1000 | Overall evaluation | Remarks |
|---|---|---|---|---|---|---|---|---|
| 35 | l | 1174 | 14 | 60 | 1.5 | 986 | X | 980 MPa class |
| 36 | l | 1001 | 21 | 23 | 1.0 | 483 | X | 980 MPa class |

TABLE 8

| Steel No. | Steel kind | TS (MPa) | EL (%) | λ (%) | R (mm) | TS × EL × λ/ 1000 | Overall evaluation | Remarks |
|---|---|---|---|---|---|---|---|---|
| 37 | m | 1029 | 22 | 47 | 0.5 | 1064 | ○ | 980 MPa class |
| 38 | m | 1196 | 13 | 47 | 1.5 | 731 | X | 1180 MPa class |
| 39 | m | 1015 | 21 | 28 | 1.0 | 597 | X | 980 MPa class |
| 40 | m | 1006 | 22 | 25 | 1.0 | 553 | X | 980 MPa class |
| 41 | m | 1167 | 14 | 58 | 1.5 | 948 | X | 980 MPa class |
| 42 | m | 1035 | 19 | 41 | 1.0 | 806 | ○ | 980 MPa class |
| 43 | n | 998 | 18 | 64 | 0.5 | 1150 | ○ | 980 MPa class |
| 44 | n | 952 | 21 | 36 | 0.5 | 720 | X | Below 980 MPa |
| 45 | o | 983 | 20 | 54 | 0.0 | 1062 | ○ | 980 MPa class |
| 46 | p | 1029 | 18 | 45 | 0.0 | 833 | ○ | 980 MPa class |
| 47 | p | 967 | 18 | 34 | 1.0 | 592 | X | Below 980 MPa |
| 48 | q | 1074 | 17 | 58 | 0.5 | 1059 | ○ | 980 MPa class |
| 49 | r | 1052 | 22 | 42 | 0.5 | 972 | ○ | 980 MPa class |
| 50 | r | 1012 | 23 | 36 | 0.5 | 838 | ○ | 980 MPa class |
| 51 | r | 1296 | 14 | 38 | 2.5 | 689 | ○ | 1270 MPa class |
| 52 | r | 951 | 24 | 35 | 0.0 | 799 | X | Below 980 MPa |
| 53 | r | 1227 | 12 | 54 | 1.5 | 795 | X | 1180 MPa class |
| 54 | r | 1049 | 22 | 24 | 1.0 | 554 | X | 980 MPa class |
| 55 | r | 1056 | 21 | 28 | 1.0 | 621 | X | 980 MPa class |
| 56 | s | 1018 | 22 | 45 | 0.5 | 1008 | ○ | 980 MPa class |
| 57 | t | 995 | 18 | 65 | 0.0 | 1164 | ○ | 980 MPa class |
| 58 | t | 1002 | 18 | 50 | 0.5 | 902 | ○ | 980 MPa class |
| 59 | u | 1185 | 16 | 55 | 1.5 | 1043 | ○ | 1180 MPa class |
| 60 | v | 1193 | 17 | 43 | 2.0 | 872 | ○ | 1180 MPa class |
| 61 | w | 1222 | 16 | 47 | 2.0 | 919 | ○ | 1180 MPa class |
| 62 | x | 1352 | 14 | 36 | 2.5 | 681 | ○ | 1270 MPa class |
| 63 | y | 1289 | 15 | 41 | 3.0 | 793 | ○ | 1270 MPa class |
| 64 | α | 875 | 20 | 56 | 0.0 | 980 | X | Below 980 MPa |
| 65 | β | 921 | 23 | 31 | 1.5 | 657 | X | Below 980 MPa |
| 66 | γ | 984 | 13 | 52 | 0.5 | 665 | X | 980 MPa class |
| 67 | δ | 887 | 25 | 44 | 0.0 | 976 | X | Below 980 MPa |

What is claimed is:

1. A cold-rolled steel sheet containing in mass %:
C: 0.10-0.3%,
Si: 1.0-3.0%,
Mn: 1.5-3%,
Al: 0.005-0.2%,
and satisfying:
P: 0.1% or below,
S: 0.05% or below
the balance comprising iron with inevitable impurities, wherein;
the metallurgical structure of the steel sheet comprises bainite, residual austenite and tempered martensite,
(1) when the metallurgical structure is observed with a scanning electron microscope;
bainite is constituted of complex structure of high temperature range forming bainite with 1 µm or above average distance between neighboring residual austenite and/or carbide and low temperature range forming bainite with below 1 µm average distance between neighboring residual austenite and/or carbide, and
when the area ratio of the high temperature range (400° C. ≦T1(° C.) ≦540° C.) forming bainite with respect to total metallurgical structure is made a and the total area ratio of the low temperature range (200° C.≦T2(° C.)≦400° C.) forming bainite and the tempered martensite with respect to the total metallurgical structure is made b,
a: 20-80%, b: 20-80%, and a+b: 70% or above are satisfied, and
(2) the volumetric ratio of residual austenite measured by a saturation magnetization method is 3% or above with respect to the total metallurgical structure.

2. The cold-rolled steel sheet according to claim 1, wherein, when a MA mixture phase in which quenched martensite and residual austenite are compounded is present in the metallurgical structure, a number ratio of the MA mixture phase satisfying that an equivalent circle diameter d at an observed cross-section exceeds 3 µm with respect to the number of the total MA mixture phase is below 15%.

3. The cold-rolled steel sheet according to claim 1, wherein an average equivalent circle diameter D of former austenite grains is 20 µm or below.

4. The cold-rolled steel sheet according to claim 1 further containing as other elements at least either one of:
Cr: 1% or below, and
Mo: 1% or below.

5. The cold-rolled steel sheet according to claim 1 further containing as other elements at least one kind selected from a group consisting of:
Ti: 0.15% or below,
Nb: 0.15% or below, and
V: 0.15% or below.

6. The cold-rolled steel sheet according to claim 1 further containing as other elements at least either one of:

Cu: 1% or below, and
Ni: 1% or below.

7. The cold-rolled steel sheet according to claim 1 further containing as other element:
B: 0.005% or below.

8. The cold-rolled steel sheet according to claim 1 further containing as other elements at least one kind selected from a group consisting of:
Ca: 0.01% or below,
Mg: 0.01% or below, and
rare earth metal: 0.01% or below.

9. The cold-rolled steel sheet according to claim 1 comprising a hot-dip galvanizing layer or a hot-dip galvannealing layer on a surface of the cold-rolled steel sheet.

10. A cold-rolled steel sheet containing in mass %:
C: 0.10-0.3%,
Si: 1.0-3.0%,
Mn: 2.0-3%,
Al: 0.005-0.2%,
and satisfying:
P: 0.1% or below,
S: 0.05% or below
the balance comprising iron with inevitable impurities, wherein;
the steel sheet has an $Ac_3$ point from 852° C. to 918° C.;
the metallurgical structure of the steel sheet comprises bainite, residual austenite and tempered martensite,
(1) when the metallurgical structure is observed with a scanning electron microscope;
bainite is constituted of complex structure of high temperature range forming bainite with 1 μm or above average distance between neighboring residual austenite and/or carbide and low temperature range forming bainite with below 1 μm average distance between neighboring residual austenite and/or carbide, and
when the area ratio of the high temperature range (400° C. $\leq T1$(° C.) $\leq 540$° C.) forming bainite with respect to total metallurgical structure is made a and the total area ratio of the low temperature range (200° C.$\leq T2$(° C.)$\leq 400$° C.) forming bainite and the tempered martensite with respect to the total metallurgical structure is made b,
a: 20-80%, b: 20-80%, and a+b: 70% or above are satisfied, and
(2) the volumetric ratio of residual austenite measured by a saturation magnetization method is 3% or above with respect to the total metallurgical structure.

11. A cold-rolled steel sheet containing in mass %:
C: 0.10-0.3%,
Si: 2.0-3.0%,
Mn: 1.5-3%,
Al: 0.005-0.2%,
and satisfying:
P: 0.1% or below,
S: 0.05% or below
the balance comprising iron with inevitable impurities, wherein;
the steel sheet has an $Ac_3$ point from 852° C. to 918° C.;
the metallurgical structure of the steel sheet comprises bainite, residual austenite and tempered martensite,
(1) when the metallurgical structure is observed with a scanning electron microscope;
bainite is constituted of complex structure of high temperature range forming bainite with 1 μm or above average distance between neighboring residual austenite and/or carbide and low temperature range forming bainite with below 1 μm average distance between neighboring residual austenite and/or carbide, and
when the area ratio of the high temperature range (400° C. $\leq T1$(° C.) $\leq 540$° C.) forming bainite with respect to total metallurgical structure is made a and the total area ratio of the low temperature range (200° C.$\leq T2$(° C.)$\leq 400$° C.) forming bainite and the tempered martensite with respect to the total metallurgical structure is made b,
a: 20-80%, b: 20-80%, and a+b: 70% or above are satisfied, and
(2) the volumetric ratio of residual austenite measured by a saturation magnetization method is 3% or above with respect to the total metallurgical structure.

12. The cold-rolled steel sheet according to claim 10, wherein the cold rolled steel sheet contains an Si content in the range of 2.0-3 mass %.

13. The cold-rolled steel sheet according to claim 1, wherein the steel sheet has an $Ac_3$ point from 860° C. to 918° C.

14. The cold-rolled steel sheet according to claim 1, wherein the cold-rolled steel sheet contains an Si content in the range of 2.0-3 mass %.

15. The cold-rolled steel sheet according to claim 13, wherein the cold rolled steel sheet contains an Mn content in the range of 2.0-3 mass %.

16. The cold-rolled steel sheet according to claim 13, wherein the cold-rolled steel sheet contains an Si content in the range of 2.0-3 mass %.

17. The cold-rolled steel sheet according to claim 1, wherein the cold-rolled steel sheet. contains an Mn content in the range of 2.0-3% and a Si content in the range of 2.0-3 mass %.

18. The cold-rolled steel sheet according to claim 13, wherein the cold-rolled steel sheet. contains an Mn content in the range of 2.0-3 mass % and an Si content in the range of 2.0-3 mass %.

* * * * *